United States Patent
Demir et al.

(10) Patent No.: US 12,125,256 B2
(45) Date of Patent: Oct. 22, 2024

(54) GENERATOR EXPLOITATION FOR DEEPFAKE DETECTION

(71) Applicant: Intel Corporation, Santa Clara, CA (US)

(72) Inventors: Ilke Demir, Hermosa Beach, CA (US); Carl S. Marshall, Portland, OR (US); Satyam Srivastava, Rancho Cordova, CA (US); Steven Gans, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 307 days.

(21) Appl. No.: 17/356,067

(22) Filed: Jun. 23, 2021

(65) Prior Publication Data

US 2021/0319240 A1    Oct. 14, 2021

(51) Int. Cl.
*G06N 3/08* (2023.01)
*G06N 3/045* (2023.01)
(Continued)

(52) U.S. Cl.
CPC ........... *G06V 10/454* (2022.01); *G06N 3/045* (2023.01); *G06N 3/08* (2013.01); *G06V 10/764* (2022.01); *G06V 10/82* (2022.01); *G06V 40/40* (2022.01)

(58) Field of Classification Search
CPC ...... G06V 10/82; G06V 40/40; G06V 10/764; G06V 10/454; G06N 3/045; G06N 3/08; G06N 3/044; G06N 3/047; G06N 3/084
See application file for complete search history.

(56) References Cited

U.S. PATENT DOCUMENTS

2016/0005050 A1* 1/2016 Teman ................. G06Q 30/018
                                                                705/317
2020/0258223 A1* 8/2020 Yip ........................ G06N 3/045
(Continued)

FOREIGN PATENT DOCUMENTS

DE         102022107186 A1 * 12/2022 ......... G06K 9/00899

OTHER PUBLICATIONS

D. Afchar, V. Nozick, J. Yamagishi, and I. Echizen. Mesonet: a compact facial video forgery detection network. In 2018 IEEE International Workshop on Information Forensics and Security (WIFS), pp. 1-7, Dec. 2018.
(Continued)

*Primary Examiner* — Shefali D Goradia
*Assistant Examiner* — D J Dhooge
(74) *Attorney, Agent, or Firm* — JAFFERY WATSON MENDONSA & HAMILTON LLP

(57) ABSTRACT

An apparatus to facilitate generator exploitation for deepfake detection is disclosed. The apparatus includes one or more processors to: alter a generative neural network of a deepfake generator with one or more modifications for deepfake detection; train the generative neural network having the one or more modifications and a discriminative neural network of the deepfake generator, wherein training the generative neural network and the discriminative neural network to facilitate the generative neural network to generate deepfake content comprising the one or more modifications; and communicate identification of the one or more modifications to a deepfake detector to cause the deepfake detector to identify deepfake content generated by the deepfake generator that comprises at least one of the one or more modifications.

20 Claims, 14 Drawing Sheets

(51) Int. Cl.
  *G06V 10/44* (2022.01)
  *G06V 10/764* (2022.01)
  *G06V 10/82* (2022.01)
  *G06V 40/40* (2022.01)

(56) References Cited

U.S. PATENT DOCUMENTS

| | | | | |
|---|---|---|---|---|
| 2020/0302161 | A1* | 9/2020 | Sriram | G06T 7/246 |
| 2021/0004810 | A1* | 1/2021 | Lind | G06N 20/00 |
| 2021/0097260 | A1* | 4/2021 | Verma | G06V 40/45 |
| 2021/0209388 | A1* | 7/2021 | Ciftci | G06V 10/764 |

OTHER PUBLICATIONS

Agarwal, S., Farid, H., Gu, Y., He, M., Nagano, K., & Li, H. (Jun. 2019). Protecting World Leaders Against Deep Fakes. In CVPR Workshops (pp. 38-45).

Yunjey Choi, Youngjung Uh, Jaejun Yoo, and Jung-Woo Ha. Stargan v2: Diverse image synthesis for multiple domains. In Proceedings of the IEEE Conference on Computer Vision and Pattern Recognition, 2020.

J. A. Ciftci, I. Demir and L. Yin, "How Do the Hearts of Deep Fakes Beat? Deep Fake Source Detection via Interpreting Residuals with Biological Signals," 2020 IEEE International Joint Conference on Biometrics (IJCB), Houston, TX, USA, 2020, pp. 1-10, doi: 10.1109/IJCB48548.2020.9304909.

J. A. Ciftci, I. Demir and L. Yin, "FakeCatcher: Detection of Synthetic Portrait Videos using Biological Signals," in IEEE Transactions on Pattern Analysis and Machine Intelligence, doi: 10.1109/TPAMI.2020.3009287.

Ziwei Liu, Ping Luo, Xiaogang Wang and Xiaoou Tang, "Deep Learning Face Attributes in the Wild", in IEEE International Conference on Computer Vision (ICCV), 2015.

J. C. Neves, R. Tolosana, R. Vera-Rodriguez, V. Lopes, H. P. Proena, and J. Fierrez. Ganprintr: Improved fakes and evaluation of the state of the art in face manipulation detection. IEEE Journal of Selected Topics in Signal Processing, 2020.

Taesung Park, Ming-Yu Liu, Ting-Chun Wang, and Jun-Yan Zhu. Semantic image synthesis with spatially-adaptive normalization. In Proceedings of the IEEE/CVF Conference on Computer Vision and Pattern Recognition (CVPR), Jun. 2019.

S.-Y. Wang, O. Wang, R. Zhang, A. Owens and A. A. Efros, "CNN-Generated Images Are Surprisingly Easy to Spot . . . for Now," 2020 IEEE/CVF Conference on Computer Vision and Pattern Recognition (CVPR), Seattle, WA, USA, 2020, pp. 8692-8701, doi: 10.1109/CVPR42600.2020.00872.

* cited by examiner

800

Alter a generative neural network of a deepfake generator with one or more modifications for deepfake detection
810

Train the generative neural network having the one or more modifications and a discriminative neural network of the deepfake generator, wherein training the generative neural network and the discriminative neural network to facilitate the generative neural network to generate deepfake content comprising the one or more modifications
820

Communicate identification of the one or more modifications to a deepfake detector to cause the deepfake detector to identify deepfake content generated by the deepfake generator that comprises at least one of the one or more modifications
830

Generate deepfake content comprising the one or more modifications
840

```
┌─────────────────────────────────────────────────────────────┐
│ Modify an architecture of a neural network in a generator   │
│ portion of a Generative Adversarial Network (GAN)           │
│                                                         922 │
└─────────────────────────────────────────────────────────────┘
                              │
                              ▼
┌─────────────────────────────────────────────────────────────┐
│ Generate output content using the generator portion of the  │
│ GAN, the output content including artifacts resulting from  │
│ the modifications to the architecture of the neural network │
│ in the generator portion of the GAN                         │
│                                                         924 │
└─────────────────────────────────────────────────────────────┘
                              │
                              ▼
┌─────────────────────────────────────────────────────────────┐
│ Notify a deep fake detector of the artifacts to expect from │
│ the modifications to the architecture of the neural network │
│ in the generator portion of the GAN, the deepfake detector  │
│ to utilize the artifacts in determining whether a content   │
│ item is generated by the GAN                                │
│                                                         926 │
└─────────────────────────────────────────────────────────────┘
```

FIG. 9B

GENERATOR EXPLOITATION FOR DEEPFAKE DETECTION

FIELD

Embodiments relate generally to data processing and more particularly to generator exploitation for deepfake detection.

BACKGROUND OF THE DESCRIPTION

Neural networks and other types of machine learning models are useful tools that have demonstrated their value solving complex problems regarding pattern recognition, natural language processing, automatic speech recognition, etc. Neural networks operate using artificial neurons arranged into one or more layers that process data from an input layer to an output layer, applying weighting values to the data during the processing of the data. Such weighting values are determined during a training process and applied during an inference process.

Neural networks can be leveraged to generate synthetic content in which a subject (e.g., a person) in an existing image or video is replaced with another's likeness. Such synthetic content is often referred to as a "deepfake". The main machine learning methods used to create deepfakes are based on deep learning and involve training generative neural network architectures, such as generative adversarial networks (GANs).

With the advent of deepfakes, the development of deepfake detection techniques has also proliferated. In the current state of the art, deepfake detection techniques may operate specifically per source generators, per impersonated persons, or per specific features.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 8 is a flow diagram illustrating an embodiment of a method for generator exploitation for deepfake detection.

FIGS. 9A-9C are flow diagrams depicting processes for generator exploitation for deepfake detection using deepfake model signatures in accordance with implementations of the disclosure.

DETAILED DESCRIPTION

Figure 1:
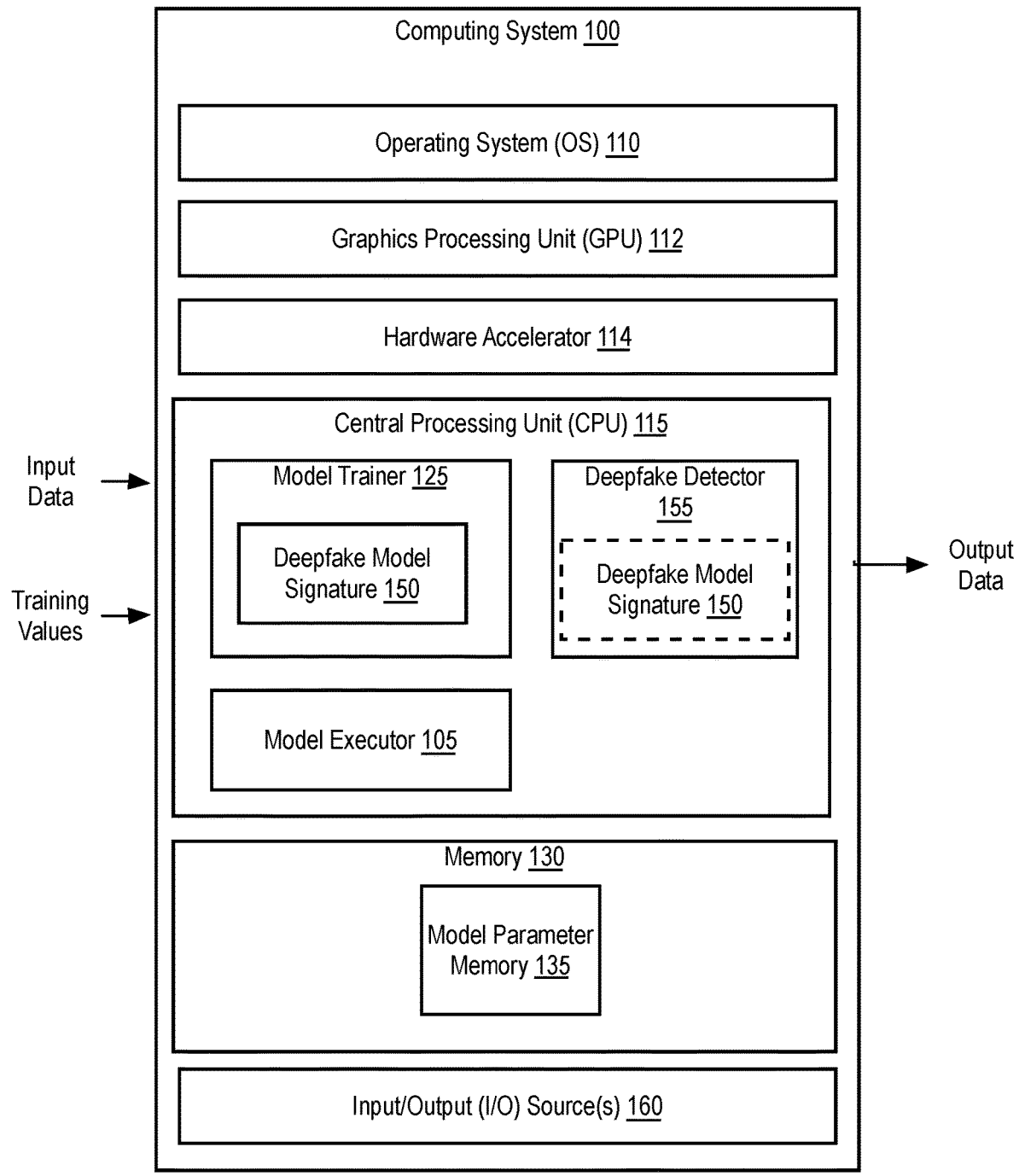
FIG. 1 is a block diagram of an example computing system that may be used to provide generator exploitation for deepfake detection, according to implementations of the disclosure.

Implementations of the disclosure describe generator exploitation for deepfake detection. In computer engineering, computing architecture is a set of rules and methods that describe the functionality, organization, and implementation of computer systems. Today's computing systems are expected to deliver near zero-wait responsiveness and superb performance while taking on large workloads for execution. Therefore, computing architectures have continually changed (e.g., improved) to accommodate demanding workloads and increased performance expectations.

Examples of large workloads include neural networks, artificial intelligence (AI), machine learning, etc. Such workloads have become more prevalent as they have been implemented in a number of computing devices, such as personal computing devices, business-related computing devices, etc. Furthermore, with the growing use of large machine learning and neural network workloads, new silicon has been produced that is targeted at running large workloads. Such new silicon includes dedicated hardware accelerators (e.g., graphics processing unit (GPU), field-programmable gate array (FPGA), vision processing unit (VPU), etc.) customized for processing data using data parallelism.

Artificial intelligence (AI), including machine learning (ML), deep learning (DL), neural networks, and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, a convolutional neural network is used. Using a convolutional neural network (CNN) enables classification of objects in images, natural language processing, etc. In general, machine learning models/architectures that are suitable to use in the example approaches disclosed herein may include convolutional neural networks. However, other types of machine learning models could additionally or alternatively be used such as recurrent neural network, feedforward neural network, generative adversarial network (GAN), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Neural networks can be leveraged to generate synthetic content in which a subject (e.g., a person) in an existing image or video is replaced with another subject's likeness. Such synthetic content is often referred to as a "deepfake" and the neural networks that generate the "deepfake" are referred to as deepfake generators. The main machine learning methods used to create deepfakes are based on deep learning and involve training generative neural network architectures, such as GANs. GANs are a class of ML frameworks where two neural networks (e.g., a "generative network" (or generator) and a "discriminative network" (or discriminator)) contest with each other in a game (in the form of a zero-sum game, where one agent's gain is another agent's loss). Given a training set, the GAN learns to generate new data with the same statistics as the training set. For example, a GAN trained on photographs can generate new photographs that look at least superficially authentic to human observers, having many realistic characteristics. The core idea of a GAN is based on the "indirect" training through a discriminator, which itself is also being updated dynamically. This means that the generator is not trained to minimize the distance to a specific image, but rather to fool the discriminator. This enables the GAN to learn in an "unsupervised" manner.

With the advent of deepfakes, the development of deepfake detection techniques has also proliferated. In the current state of the art, deepfake detection techniques may operate specifically per source generators, per impersonated persons, or per specific features. In particular, traditional solutions for deepfake detection rely on training a classifier on a large collection of datasets, wherein the classifier aims to determine the common attributes that statistically work "well" for a group of subjects. However, these conventional deepfake detection solutions do not integrate options into the deepfake generator for detection. Moreover, these previous conventional solutions have disadvantages. For example, prior solutions look at only the output to determine if the content is a deepfake or not.

Implementations of the disclosure improve deepfake detection by providing generator exploitation for deepfake detection. For example, implementations of the disclosure provide generator exploitation of a GAN by embedding deepfake model signatures in the GAN using one or more of input manipulation of the GAN, architecture modification of the GAN, and/or intermediary signal insertion in the GAN. In implementations of the disclosure, the deepfake model signatures are provided to a deepfake detector component that can then utilize the deepfake model signatures to identify whether or not generated content samples are generated by the GAN (e.g., whether the generated content is an "authorized" deepfake).

Implementations of the disclosure provide for a variety of technical advantages over the conventional approaches. Advantages of implementations of the disclosure include improved deepfake detection accuracy, improved content moderation, improved detection of harmful video marking, and/or enable limiting illegal uses of deepfakes. Implementations of the disclosure also provide a relation between the generator and the source, which can then be used in one or more of verification of original content, creative content authentication, and/or provenance for legal uses of generative models.

Implementations of the disclosure aim to make the use of generative AI more detectable by amplifying the signals (using the above-described techniques) created by the GAN. As such, creative users interested in establishing the authenticity of their content may value this capability in editing tools. Implementations of the disclosure may encourage independent software vendors (ISVs) to incorporate such detectable GANs into their neural enhancement flows.

FIG. 1 is a block diagram of an example computing system that may be used to implement generator exploitation for deepfake detection, according to implementations of the disclosure. The example computing system 100 may be implemented as a component of another system such as, for example, a mobile device, a wearable device, a laptop computer, a tablet, a desktop computer, a server, etc. In one embodiment, computing system 100 includes or can be integrated within (without limitation): a server-based gaming platform; a game console, including a game and media console; a mobile gaming console, a handheld game console, or an online game console. In some embodiments the computing system 100 is part of a mobile phone, smart phone, tablet computing device or mobile Internet-connected device such as a laptop with low internal storage capacity.

In some embodiments the computing system 100 is part of an Internet-of-Things (IoT) device, which are typically resource-constrained devices. IoT devices may include embedded systems, wireless sensor networks, control systems, automation (including home and building automation), and other devices and appliances (such as lighting fixtures, thermostats, home security systems and cameras, and other home appliances) that support one or more common ecosystems, and can be controlled via devices associated with that ecosystem, such as smartphones and smart speakers.

Computing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the computing system 100 includes or is part of a television or set top box device. In one embodiment, computing system 100 can include, couple with, or be integrated within a self-driving vehicle such as a bus, tractor trailer, car, motor or electric power cycle, plane or glider (or any combination thereof). The self-driving vehicle may use computing system 100 to process the environment sensed around the vehicle.

As illustrated, in one embodiment, computing system 100 may include any number and type of hardware and/or software components, such as (without limitation) graphics processing unit ("GPU", general purpose GPU (GPGPU), or simply "graphics processor") 112, a hardware accelerator 114, central processing unit ("CPU" or simply "application processor") 115, memory 130, network devices, drivers, or the like, as well as input/output (I/O) sources 160, such as touchscreens, touch panels, touch pads, virtual or regular keyboards, virtual or regular mice, ports, connectors, etc. Computing system 100 may include operating system (OS) 110 serving as an interface between hardware and/or physical resources of the computing system 100 and a user. In some implementations, the computing system 100 may include a combination of one or more of the CPU 115, GPU 112, and/or hardware accelerator 114 on a single system on a chip (SoC), or may be without a GPU 112 or visual output (e.g., hardware accelerator 114) in some cases, etc.

As used herein, "hardware accelerator", such as hardware accelerator 114, refers to a hardware device structured to provide for efficient processing. In particular, a hardware accelerator may be utilized to provide for offloading of some processing tasks from a central processing unit (CPU) or other general processor, wherein the hardware accelerator may be intended to provide more efficient processing of the processing tasks than software run on the CPU or other processor. A hardware accelerator may include, but is not limited to, a graphics processing unit (GPU), a vision processing unit (VPU), neural processing unit, AI (Artificial Intelligence) processor, field programmable gate array (FPGA), or application-specific integrated circuit (ASIC).

The GPU 112 (or graphics processor 112), hardware accelerator 114, and/or CPU 115 (or application processor 115) of example computing system 100 may include a model trainer 125 and model executor 105. Although the model trainer 125 and model executor 105 are depicted as part of the CPU 115, in some implementations, the GPU 112 and/or hardware accelerator 114 may include the model trainer 125 and model executor 105.

The example model executor 105 accesses input values (e.g., via an input interface (not shown)), and processes those input values based on a machine learning model stored in a model parameter memory 135 of the memory 130 to produce output values (e.g., via an output interface (not shown)). The input data may be received from one or more data sources (e.g., via one or more sensors, via a network interface, etc.). However, the input data may be received in any fashion such as, for example, from an external device (e.g., via a wired and/or wireless communication channel). In some examples, multiple different types of inputs may be received. In some examples, the input data and/or output data is received via inputs and/or outputs of the system of which the computing system 100 is a component.

In the illustrated example of FIG. 1, the example neural network parameters stored in the model parameter memory 135 are trained by the model trainer 125 such that input training data (e.g., received via a training value interface (not shown)) results in output values based on the training data. In the illustrated example of FIG. 1, the model trainer 125 can include an embedded deepfake model signature 150 that is utilized when processing the model during training and/or inference. In implementations of the disclosure, the deepfake model signature 150 is provided to a deepfake detector 155 to be used for identification of deepfake content that is generated by the model.

The example model executor 105, the example model trainer 125, the example deepfake model signature 150, and/or the deepfake detector 155 are implemented by one or more logic circuits such as, for example, hardware processors. In some examples, one or more of the example model executor 105, the example model trainer 125, the example deepfake model signature 150, and/or the deepfake detector 155 may be implemented by a same hardware component (e.g., a same logic circuit) or by different hardware components (e.g., different logic circuits, different computing systems, etc.). However, any other type of circuitry may additionally or alternatively be used such as, for example, one or more analog or digital circuit(s), logic circuits, programmable processor(s), application specific integrated circuit(s) (A SIC(s)), programmable logic device(s) (PLD(s)), field programmable logic device(s) (FPLD(s)), digital signal processor(s) (DSP(s)), etc.

In examples disclosed herein, the example model executor 105 executes a machine learning model. The example machine learning model may be implemented using a neural network (e.g., a feedforward neural network). However, any other past, present, and/or future machine learning topology(ies) and/or architecture(s) may additionally or alternatively be used such as, for example, a CNN.

To execute a model, the example model executor 105 accesses input data. The example model executor 105 applies the model (defined by the model parameters (e.g., neural network parameters including weight and/or activations) stored in the model parameter memory 135) to the input data.

The example model parameter memory 135 of the illustrated example of FIG. 1 is implemented by any memory, storage device and/or storage disc for storing data such as, for example, flash memory, magnetic media, optical media, etc. Furthermore, the data stored in the example model parameter memory 135 may be in any data format such as, for example, binary data, comma delimited data, tab delimited data, structured query language (SQL) structures, etc. While in the illustrated example the model parameter memory 135 is illustrated as a single element, the model parameter memory 135 and/or any other data storage elements described herein may be implemented by any number and/or type(s) of memories. In the illustrated example of FIG. 1, the example model parameter memory 135 stores model weighting parameters that are used by the model executor 105 to process inputs for generation of one or more outputs as output data.

In examples disclosed herein, the output data may be information that classifies the received input data (e.g., as determined by the model executor 105.). However, any other type of output that may be used for any other purpose may additionally or alternatively be used. In examples disclosed herein, the output data may be output by an input/output (I/O) source 160 that displays the output values. However, in some examples, the output data may be provided as output values to another system (e.g., another circuit, an external system, a program executed by the computing system 100, etc.). In some examples, the output data may be stored in a memory.

The example model trainer 125 of the illustrated example of FIG. 1 compares expected outputs (e.g., received as training values at the computing system 100) to outputs produced by the example model executor 105 to determine an amount of training error, and updates the model parameters (e.g., model parameter memory 135) based on the amount of error. After a training iteration, the amount of error is evaluated by the model trainer 125 to determine whether to continue training. In examples disclosed herein, errors are identified when the input data does not result in an expected output. That is, error is represented as a number of incorrect outputs given inputs with expected outputs. However, any other approach to representing error may additionally or alternatively be used such as, for example, a percentage of input data points that resulted in an error.

The example model trainer 125 determines whether the training error is less than a training error threshold. If the training error is less than the training error threshold, then the model has been trained such that it results in a sufficiently low amount of error, and no further training is pursued. In examples disclosed herein, the training error threshold is ten errors. However, any other threshold may additionally or alternatively be used. Moreover, other types of factors may be considered when determining whether model training is complete. For example, an amount of training iterations performed and/or an amount of time elapsed during the training process may be considered.

The training data that is utilized by the model trainer 125 includes example inputs (corresponding to the input data expected to be received), as well as expected output data. In examples disclosed herein, the example training data is provided to the model trainer 125 to enable the model trainer 125 to determine an amount of training error.

In examples disclosed herein, the example model trainer 125 utilizes the combination of the example deepfake model signature 150 and the deepfake detector 155 to implement generator exploitation for deepfake detection. In implementations of the disclosure, the generator exploitation for deepfake detection can include embedding deepfake model signatures, such as deepfake model signature 150, in the ML model (such as a GAN) using one or more of input manipulation of the ML model, architecture modification of the ML model, and/or intermediary signal insertion in the ML model. In one implementation, the deepfake model signature 150 of the example model trainer 125 used in combination with the deepfake detector 155 described with respect to FIG. 1 provides for the generator exploitation for deepfake detection, as described herein. The deepfake model signatures, such as deepfake model signature 150 of FIG. 1, can be provided to a deepfake detector component, such as deepfake detector 155 of FIG. 1, that can then utilize the deepfake model signatures to identify whether or not generated content samples are generated by the ML model (i.e., an authorized deepfake).

As discussed above, to train a model, such as a machine learning model utilizing a neural network, the example model trainer 125 trains a machine learning model using the deepfake model signature 150. Further discussion and detailed description of the model trainer 125, the mode executor 105, the deepfake model signature 150, and the deepfake detector 155 are provided below with respect to FIGS. 2-10.

The example I/O source 160 of the illustrated example of FIG. 1 enables communication of the model stored in the model parameter memory 135 with other computing systems. In some implementations, the I/O source(s) 160 may include, at but is not limited to, a network device, a microprocessor, a camera, a robotic eye, a speaker, a sensor, a display screen, a media player, a mouse, a touch-sensitive device, and so on. In this manner, a central computing system (e.g., a server computer system) can perform training of the model and distribute the model to edge devices for utilization (e.g., for performing inference operations using the model). In examples disclosed herein, the I/O source 160 is implemented using an Ethernet network communicator. However, any other past, present, and/or future type(s) of communication technologies may additionally or alternatively be used to communicate a model to a separate computing system.

While an example manner of implementing the computing system 100 is illustrated in FIG. 1, one or more of the elements, processes and/or devices illustrated in FIG. 1 may be combined, divided, re-arranged, omitted, eliminated and/or implemented in any other way. Further, the example model executor 105, the example model trainer 125, the example deepfake model signature 150, the example deepfake model detector 155, the I/O source(s) 160, and/or, more generally, the example computing system 100 of FIG. 1 may be implemented by hardware, software, firmware and/or any combination of hardware, software and/or firmware. Thus, for example, any of the example model executor 105, the example model trainer 125 the example deepfake model signature 150, the example deepfake model detector 155, the example I/O source(s) 160, and/or, more generally, the example computing system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some implementations of the disclosure, a software and/or firmware implementation of at least one of the example model executor 105, the example model trainer 125, the example deepfake model signature 150, the example deepfake model detector 155, the example I/O source(s) 160, and/or, more generally, the example computing system 100 of FIG. 1 be provided. Such implementations can include a non-transitory computer readable storage device or storage disk (also referred to herein as a non-transitory computer-readable storage medium) such as a memory, a digital versatile disk (DVD), a compact disk (CD), a Blu-ray disk, etc. including the software and/or firmware. Further still, the example computing system 100 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not utilize direct physical (e.g., wired) communication and/or constant communication, but rather additionally includes selective communication at periodic intervals, scheduled intervals, aperiodic intervals, and/or one-time events.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An example type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 2:
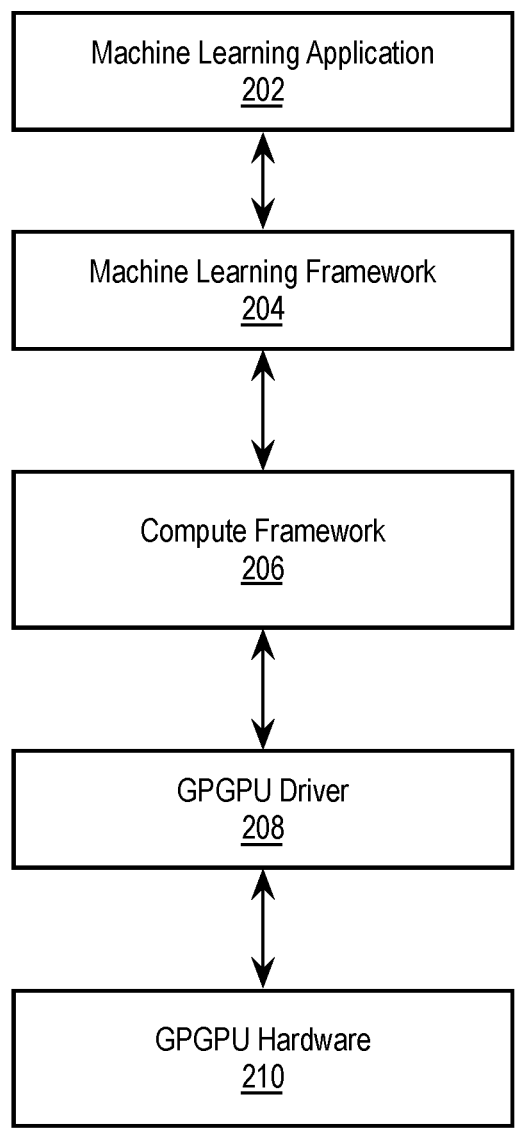
FIG. 2 illustrates a machine learning software stack, according to an embodiment.

FIG. 2 is a generalized diagram of a machine learning software stack 200. A machine learning application 202 can be configured to train a neural network using a training dataset or to use a trained deep neural network to implement machine intelligence. The machine learning application 202 can include training and inference functionality for a neural network and/or specialized software that can be used to train a neural network before deployment. The machine learning application 202 can implement any type of machine intelligence including but not limited to image recognition, mapping and localization, autonomous navigation, speech synthesis, medical imaging, or language translation.

Hardware acceleration for the machine learning application 202 can be enabled via a machine learning framework 204. The machine learning framework 204 can provide a library of machine learning primitives. Machine learning primitives are basic operations that are commonly performed by machine learning algorithms. Without the machine learning framework 204, developers of machine learning algorithms would have to create and optimize the main computational logic associated with the machine learning algorithm, then re-optimize the computational logic as new parallel processors are developed. Instead, the machine learning application can be configured to perform the computations using the primitives provided by the machine learning framework 204. Example primitives include tensor convolutions, activation functions, and pooling, which are computational operations that are performed while training a convolutional neural network (CNN). The machine learning framework 204 can also provide primitives to implement basic linear algebra subprograms performed by many machine-learning algorithms, such as matrix and vector operations.

The machine learning framework 204 can process input data received from the machine learning application 202 and generate the appropriate input to a compute framework 206. The compute framework 206 can abstract the underlying instructions provided to the GPGPU driver 208 to enable the machine learning framework 204 to take advantage of hardware acceleration via the GPGPU hardware 210 without requiring the machine learning framework 204 to have intimate knowledge of the architecture of the GPGPU hardware 210. Additionally, the compute framework 206 can enable hardware acceleration for the machine learning framework 204 across a variety of types and generations of the GPGPU hardware 210.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One example type of neural network is the feedforward network, as previously described.

A second example type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present example feedforward, CNN, and RNN networks, as well as describe a general process for respectively training and deploying each of those types of networks. It can be understood that these descriptions are example and non-limiting as to any specific embodiment described herein and the concepts illustrated can be applied generally to deep neural networks and machine learning techniques in general.

The example neural networks described above can be used to perform deep learning. Deep learning is machine learning using deep neural networks. The deep neural networks used in deep learning are artificial neural networks composed of multiple hidden layers, as opposed to shallow neural networks that include a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models can be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the sought-after output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 3A:
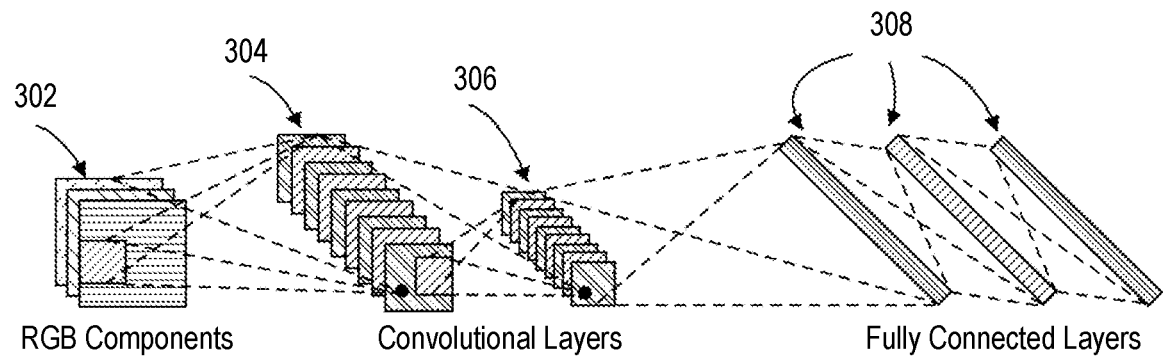
FIGS. 3A-3B illustrate layers of example deep neural networks.
Figure 3B:
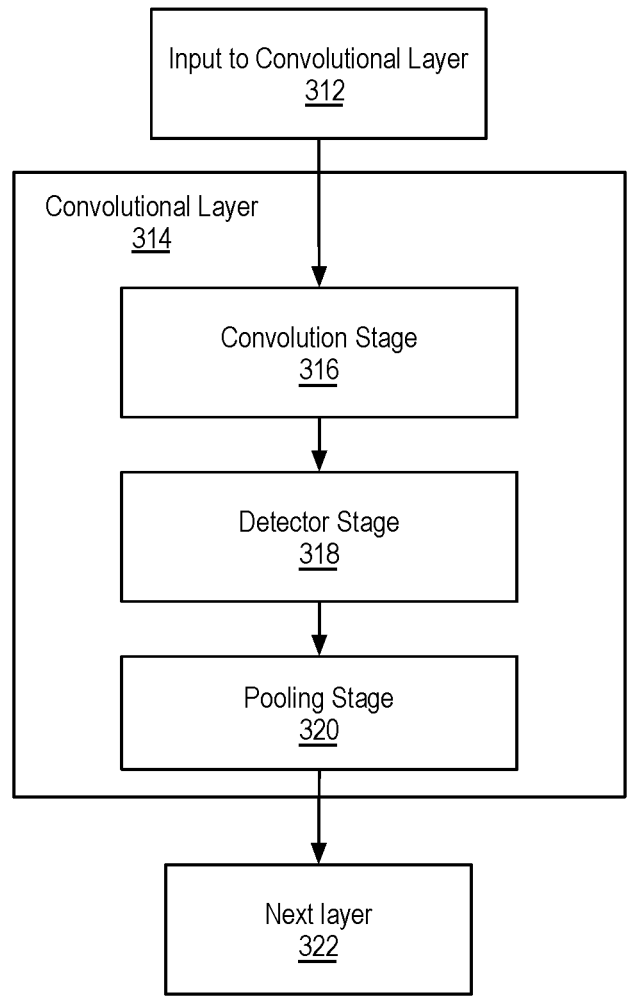

FIGS. 3A-3B illustrate an example convolutional neural network. FIG. 3A illustrates various layers within a CNN. As shown in FIG. 3A, an example CNN used to model image processing can receive input 302 describing the red, green, and blue (RGB) components of an input image. The input 302 can be processed by multiple convolutional layers (e.g., first convolutional layer 304, second convolutional layer 306). The output from the multiple convolutional layers may optionally be processed by a set of fully connected layers 308. Neurons in a fully connected layer have full connections to all activations in the previous layer, as previously described for a feedforward network. The output from the fully connected layers 308 can be used to generate an output result from the network. The activations within the fully connected layers 308 can be computed using matrix multiplication instead of convolution. Not all CNN implementations make use of fully connected layers 308. For example, in some implementations the second convolutional layer 306 can generate output for the CNN.

The convolutional layers are sparsely connected, which differs from traditional neural network configuration found in the fully connected layers 308. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 3B illustrates example computation stages within a convolutional layer of a CNN. Input to a convolutional layer 312 of a CNN can be processed in three stages of a convolutional layer 314. The three stages can include a convolution stage 316, a detector stage 318, and a pooling stage 320. The convolutional layer 314 can then output data to a successive convolutional layer. The final convolutional layer of the network can generate output feature map data or provide input to a fully connected layer, for example, to generate a classification value for the input to the CNN.

In the convolution stage 316 performs several convolutions in parallel to produce a set of linear activations. The convolution stage 316 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 316 defines a set of linear activations that are processed by successive stages of the convolutional layer 314.

The linear activations can be processed by a detector stage 318. In the detector stage 318, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 320 uses a pooling function that replaces the output of the second convolutional layer 306 with a summary statistic of the nearby outputs. The pooling function can be used to introduce translation invariance into the neural network, such that small translations to the input do not change the pooled outputs. Invariance to local translation can be useful in scenarios where the presence of a feature in the input data is weighted more heavily than the precise location of the feature. Various types of pooling functions can be used during the pooling stage 320, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 314 can then be processed by the next layer 322. The next layer 322 can be an additional convolutional layer or one of the fully connected layers 308. For example, the first convolutional layer 304 of FIG. 3A can output to the second convolutional layer 306, while the second convolutional layer can output to a first layer of the fully connected layers 308.

Figure 4:
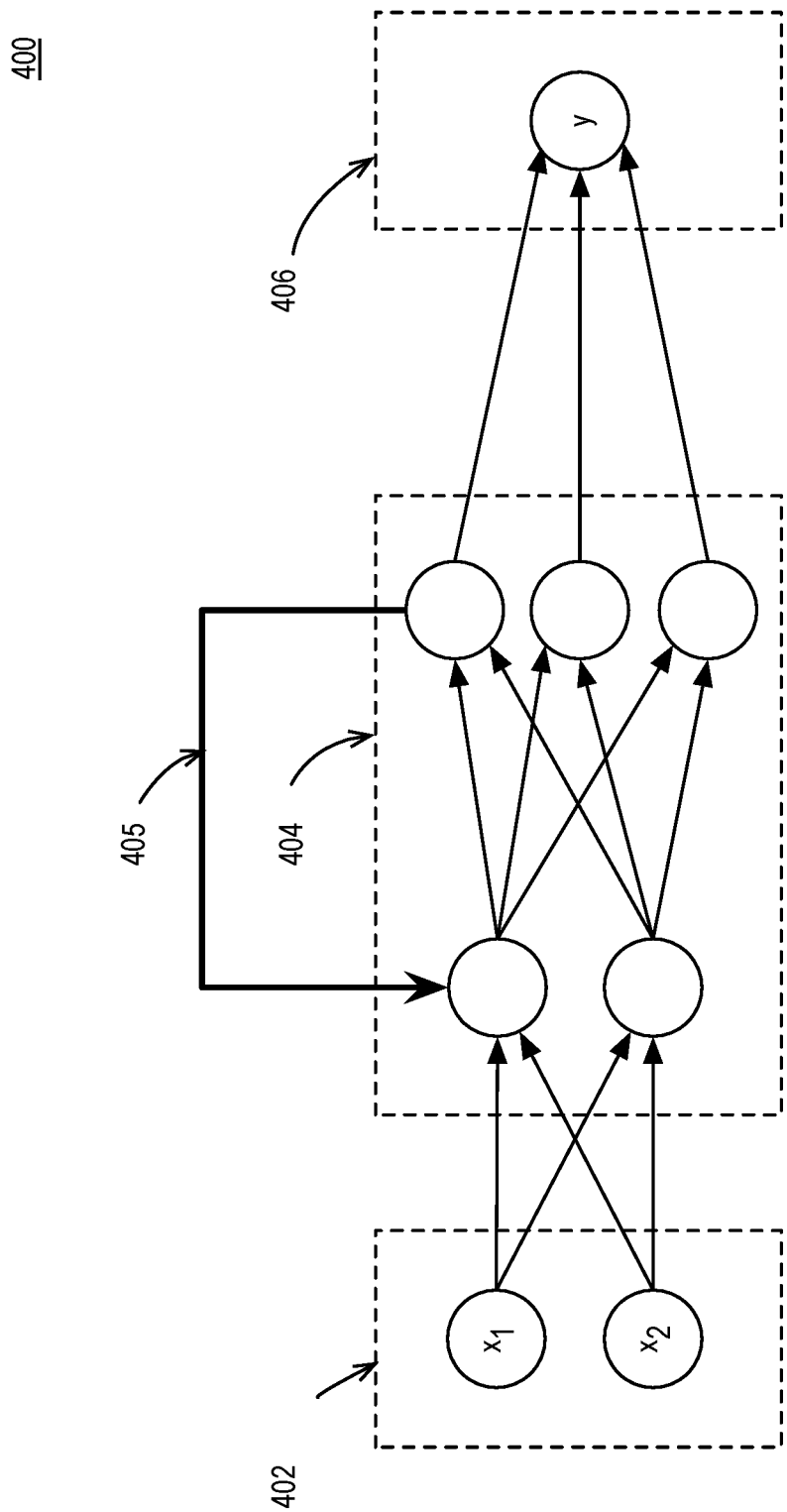
FIG. 4 illustrates an example recurrent neural network.

FIG. 4 illustrates an example recurrent neural network. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 400 can be described as having an input layer 402 that receives an input vector, hidden layers 404 to implement a recurrent function, a feedback mechanism 405 to enable a 'memory' of previous states, and an output layer 406 to output a result. The RNN 400 operates based on time-steps. The state of the RNN at a given time step is influenced based on the previous time step via the feedback mechanism 405. For a given time step, the state of the hidden layers 404 is defined by the previous state and the input at the current time step. An initial input ($x_1$) at a first time step can be processed by the hidden layer 404. A second input ($x_2$) can be processed by the hidden layer 404 using state information that is determined during the processing of the initial input ($x_1$). A given state can be computed as $s_t = f(Ux_t + Ws_{t-1})$, where U and W are parameter matrices. The function $f$ is generally a nonlinearity, such as the hyperbolic tangent function (Tanh) or a variant of the rectifier function $f(x) = max(0, x)$. However, the specific mathematical function used in the hidden layers 404 can vary depending on the specific implementation details of the RNN 400.

In addition to the basic CNN and RNN networks described, variations on those networks may be enabled. One example RNN variant is the long short-term memory (LSTM) RNN. LSTM RNNs are capable of learning long-term dependencies that may be utilized for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimized initial set of weights for the neural network.

Figure 5:
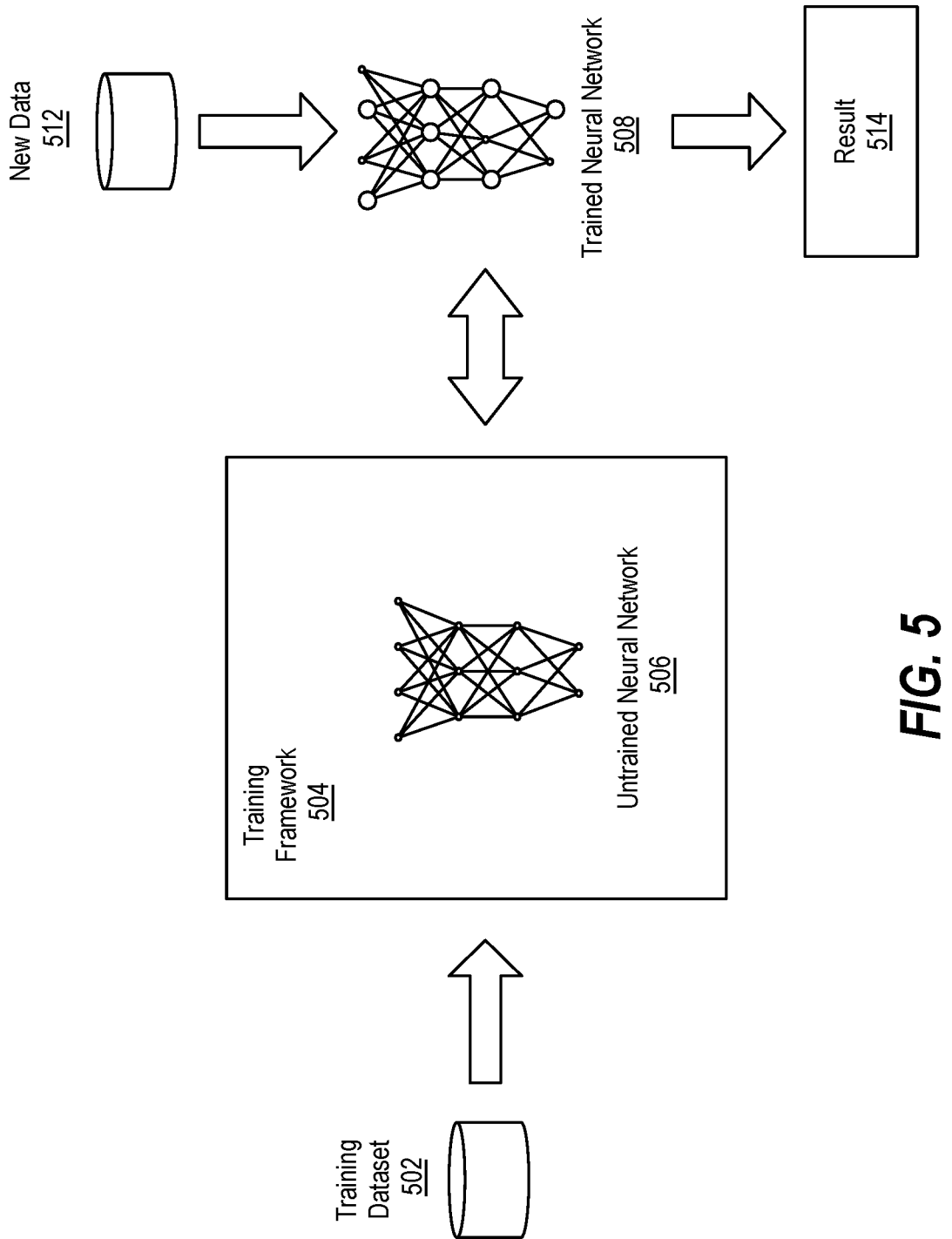
FIG. 5 illustrates training and deployment of a deep neural network.

FIG. 5 illustrates training and deployment of a deep neural network. Once a given network has been structured for a task the neural network is trained using a training dataset 502. Various training frameworks have been developed to enable hardware acceleration of the training process. For example, the machine learning framework 204 of FIG. 2 may be configured as a training framework 504. The training framework 504 can hook into an untrained neural network 506 and enable the untrained neural network to be trained using the parallel processing resources described herein to generate a trained neural network 508. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 502 includes input paired with the sought-after output for the input, or where the training dataset includes input having known output and the output of the neural network is manually graded. The network processes the inputs and compares the resulting outputs against a set of expected or sought-after outputs. Errors are then propagated back through the system. The training framework 504 can adjust to adjust the weights that control the untrained neural network 506. The training framework 504 can provide tools to monitor how well the untrained neural network 506 is converging towards a model suitable to generating correct answers based on known input data. The training process occurs repeatedly as the weights of the network are adjusted to refine the output generated by the neural network. The training process can continue until the neural network reaches a statistically relevant accuracy associated with a trained neural network 508. The trained neural network 508 can then be deployed to implement any number of machine learning operations to generate an inference result 514 based on input of new data 512.

Unsupervised learning is a learning method in which the network attempts to train itself using unlabeled data. Thus, for unsupervised learning the training dataset 502 can include input data without any associated output data. The untrained neural network 506 can learn groupings within the unlabeled input and can determine how individual inputs are related to the overall dataset. Unsupervised training can be used to generate a self-organizing map, which is a type of trained neural network 508 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 502 includes a mix of labeled and unlabeled data of the same distribution. Incremental learning is a variant of supervised learning in which input data is continuously used to further train the model. Incremental learning enables the trained neural network 508 to adapt to the new data 512 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.
Example Machine Learning Applications Machine learning can be applied to solve a variety of technological problems, including but not limited to computer vision, autonomous driving and navigation, speech recognition, and language processing. Computer vision has traditionally been an active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes a probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Example natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training, while deployed machine learning (e.g., inferencing) platforms generally include lower power parallel processors suitable for use in products such as cameras, autonomous robots, and autonomous vehicles.

Generator Exploitation for Deepfake Detection

As discussed above, implementations of the disclosure provide for generator exploitation for deepfake detection. As previously discussed, neural networks can be leveraged to generate synthetic content in which a person in an existing image or video is replaced with someone else's likeness. Such synthetic content is often referred to as a "deepfake". The main machine learning methods used to create deepfakes are based on deep learning and involve training generative neural network architectures, such as GANs (described above).

With the advent of deepfakes, the development of deepfake detection techniques has also proliferated. Conventional solutions for deepfake detection rely on training a classifier on a large collection of datasets which aims to determine the common attributes that statistically work "well" for a group of subjects. These solutions do not integrate options into the deepfake generator for detection.

Implementations of the disclosure provide for generator exploitation for deepfake detection. Implementations provide generator exploitation of a GAN by embedding deepfake model signatures in the GAN using one or more of input manipulation of the GAN, architecture modification of the GAN, and/or intermediary signal insertion in the GAN. In one implementation, the deepfake model signature 150 of the example model trainer 125 used in combination with the deepfake detector 155 described with respect to FIG. 1 provides for the generator exploitation for deepfake detection, as described herein. The deepfake model signatures, such as deepfake model signature 150 of FIG. 1, can be provided to a deepfake detector component, such as deepfake detector 155 of FIG. 1, that can then utilize the deepfake model signatures to identify whether or not generated content samples are generated by the GAN (i.e., an authorized deepfake). The following description and figures detail such an implementation.

Figure 6A:
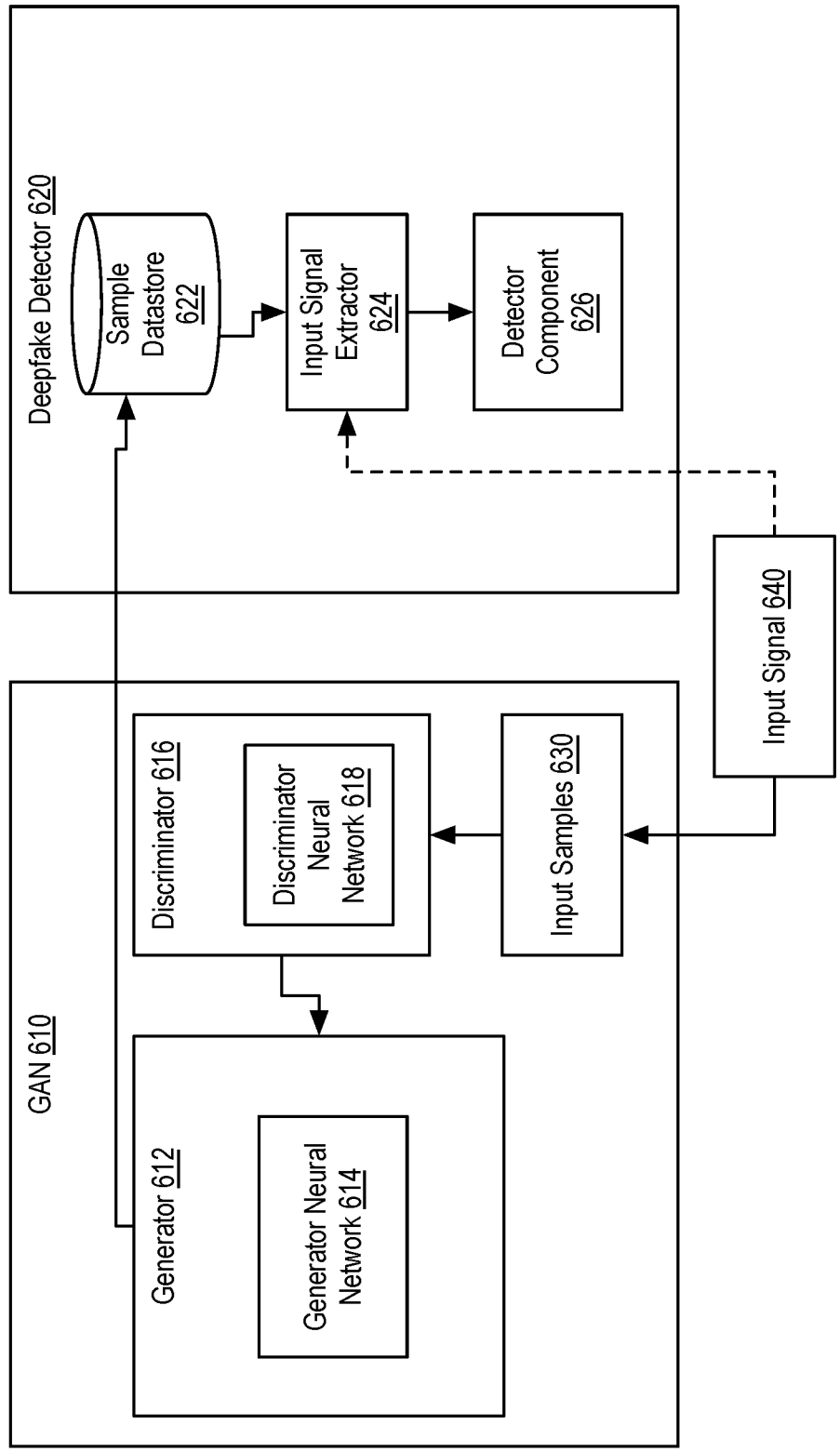
FIG. 6A illustrates a deepfake system including a generative model with input manipulation for deepfake detection, in accordance with implementations of the disclosure.
Figure 6B:
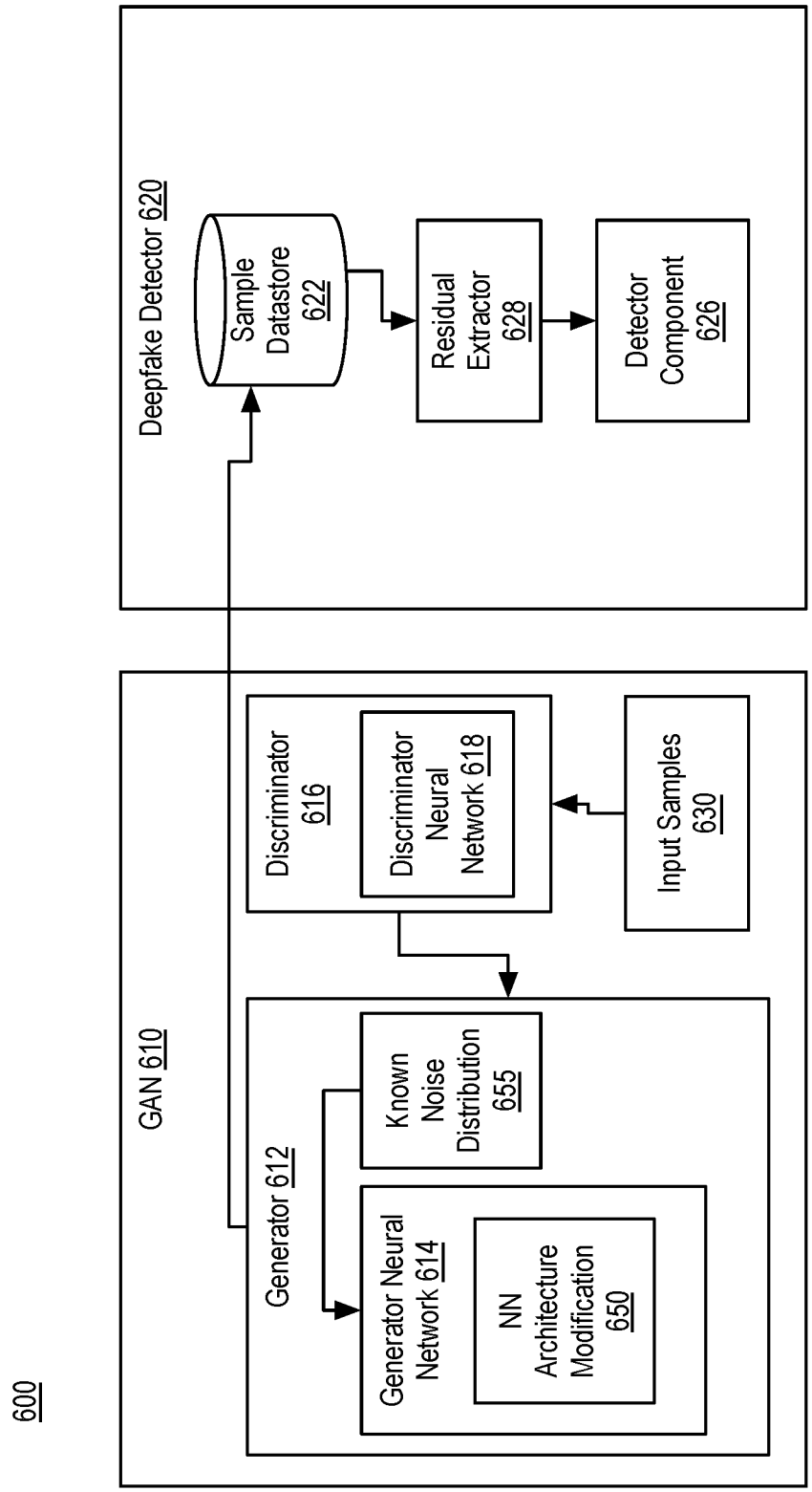
FIG. 6B depicts a deepfake system including a generative model with architecture modification for deepfake detection, in accordance with implementations of the disclosure.
Figure 6C:
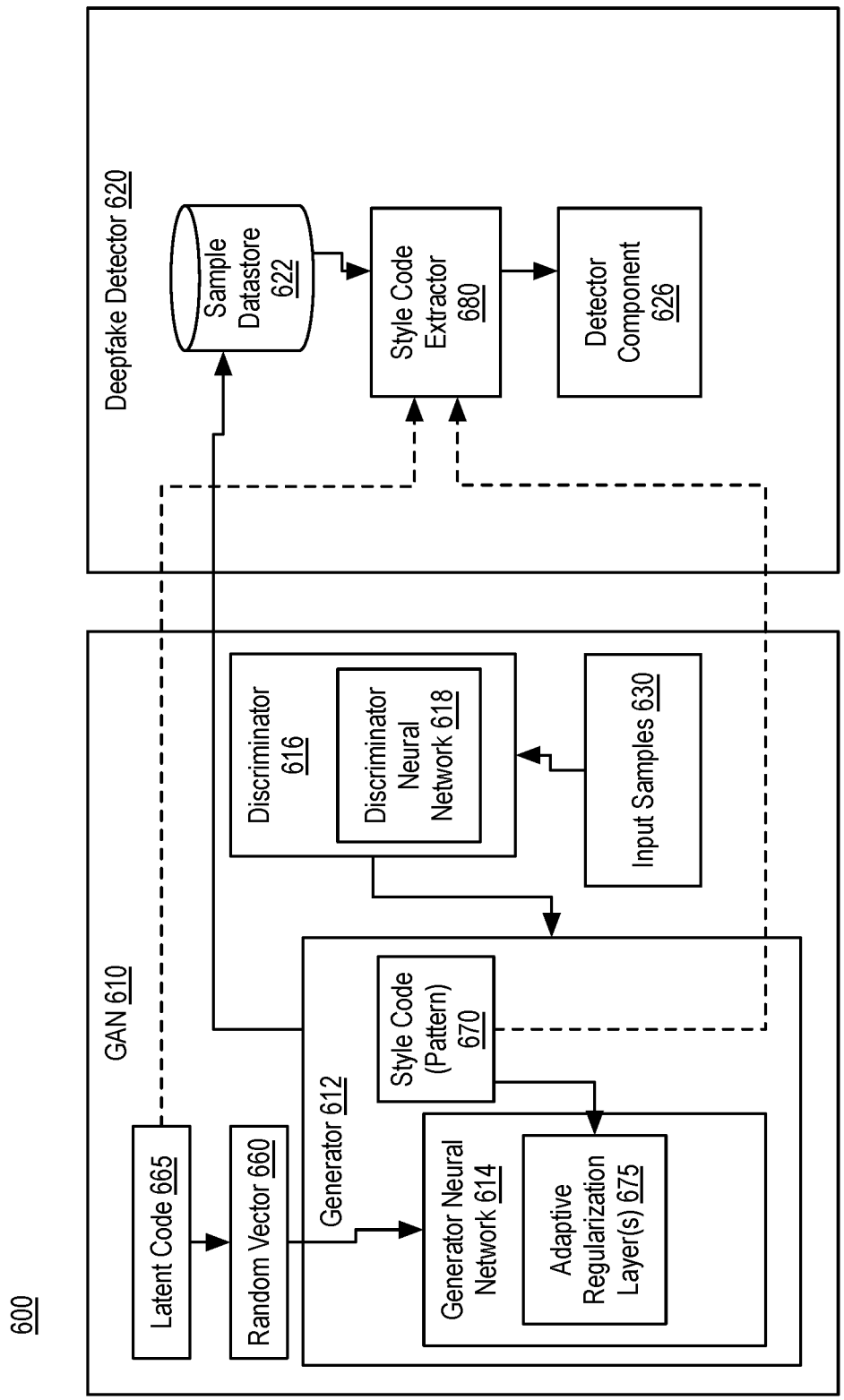
FIG. 6C depicts a deepfake system including a generative model with intermediary signal insertion for deepfake detection, in accordance with implementations of the disclosure.

FIGS. 6A, 6B, and 6C depict examples of embedding deepfake model signatures relative to an existing generative model architecture in accordance with implementations of the disclosure. In one example, FIG. 6A depicts a generative model with input manipulation for deepfake detection. In another example, FIG. 6B depicts a generative model with architecture modification for deepfake detection. In a further example, FIG. 6C depicts a generative model with intermediary signal insertion for deepfake detection. Implementations of the disclosure may combine one or more of the embodiments discussed in FIGS. 6A-6C individually and/or in combination with one another to provide for generator exploitation for deepfake detection.

In one embodiment, FIG. 6A depicts a deepfake system 600 including a generative model with input manipulation for deepfake detection, in accordance with implementations of the disclosure. In one embodiment, deepfake system 600 can include a GAN 610 communicably coupled to a deepfake detector 620. In some embodiments, GAN 610 and deepfake detector 620 may be implemented in the same computing device. In some embodiments, GAN 610 and deepfake detector 620 are implemented in separate computing devices and are communicably coupled via a network (not shown). GAN 610 and/or deepfake detector 620 may be implemented using hardware circuitry, such as one or more of a CPU, a GPU, a hardware accelerator, and so on. In one embodiment, GAN 610 and/or deepfake detector 620 may be implemented using computing system 100 described with respect to FIG. 1.

More generally, the example deepfake system 600 of FIG. 6A may be implemented by hardware, software, firmware and/or any combination of hardware, software and/or firmware. Thus, for example, any of the example GAN 610 and/or the example deepfake detector 620 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

GAN 610 may provide a machine learning framework including a generative network referred to as generator 612 and a discriminative network referred to as discriminator 616. In one embodiment, the generator 612 includes a generator neural network 614 configured to learn to map from a latent space to a data distribution of interest. The discriminator 616 includes a discriminator neural network 618 configured to distinguish candidates produced by the generator 612 from the true data distribution. The generator neural network's 614 training objective is to increase the error rate of the discriminator 616 (e.g., "fool" the discriminator 616 by producing novel candidates that the discriminator 616 thinks are not synthesized (are part of the true data distribution)).

A known data set, such as input samples 630, can serve as the initial training data for the discriminator 616. Training the discriminator 616 involves presenting the discriminator with one or more of the input samples 630 from a training dataset until the discriminator 616 achieves an acceptable accuracy. The generator 612 trains based on whether it succeeds in fooling the discriminator 616. The generator 612 may be seeded with randomized input that is sampled from a predefined latent space (e.g., a multivariate normal distribution). Thereafter, candidates synthesized by the generator 612 are evaluated by the discriminator 616. Independent backpropagation procedures can be applied to both networks 614, 618 of the generator 612 and discriminator 616 so that the generator 612 produces (e.g., synthesizes) better samples, while the discriminator 616 becomes more skilled at flagging synthetic samples. In one example, when the GAN 610 is used for image generation, the generator neural network 614 may be a deconvolutional neural network, and the discriminator neural network 618 may be a convolutional neural network.

Conventionally, state-of-the-art datasets can be used as the training dataset for the input samples 630 to the generative tasks of GAN 610. The training dataset can be, for example, audio, image, or video content. Implementations of the disclosure can manipulate the training datasets for input samples 630 to insert some signals that can be recovered after the generative process is performed by the GAN 610. By providing a signal (e.g., deepfake model signature) for input manipulation of the input samples 630, the deepfake detector 620 can determine whether a sample is either an actual content item (e.g., from the training dataset) or is a generated content item (e.g., synthesized sample). Implementations of the disclosure embed specific signals (e.g., deepfake model signature), such as input signal 640, into mainstream datasets used for training of the GAN (i.e., input samples 630) to improve deepfake detection when the samples of the learned distribution also contain such signals. These embedded input signals 640 can be of a specific form to help the design of the deepfake detector 620, or they can be determined input signals 640 that can be recovered from every generated sample.

The deepfake detector 620 may include one or more of a sample datastore 622, an input signal extractor 624, and a detector component 626. Deepfake detector 620 may include more or less components than illustrated and described herein and is not limited to the particular example depiction of FIG. 6A. Sample datastore 622 may be a datastore maintaining a set of content items to be analyzed by the deepfake detector for purposes of determining whether the content item is considered a deepfake (e.g., synthesized by a GAN, such as GAN 610). Input signal extractor 624 may receive identification of a signal, such as a specific input signal 640, that is embedded in input samples 630 of a training dataset of GAN 610. The input signal extractor 624 can be configured to analyze the samples from sample datastore 622 to extract such an embedded input signal 640 from the sample.

Detector component 626 may be configured to determine whether a sample from the sample datastore 622 is a deepfake (synthesized) sample or a real (non-synthesized) sample. In one implementation, detector component 626 may determine whether the input signal 640 is embedded in the sample for purposes of identifying whether the sample is a deepfake (generated/synthesized by GAN 610) or a real sample. Detector component 626 may also utilize other signals and methodologies for identifying deepfake samples in addition to the input signal 640. In some implementations, detector component 626 is an ML model that is trained for deepfake detection and can utilize the input signal 640 as part of its training data.

The example input signal extractor 624 and/or the example detector component 626 of FIG. 6A may be implemented by hardware, software, firmware and/or any combination of hardware, software and/or firmware. Thus, for example, any of the example input signal extractor 624 and/or the example detector component 626 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In one implementation, the input signal 640 used for input manipulation can include watermarking of the training dataset. If implementations can place a watermark on the input samples of the training dataset without compromising the output quality of the GAN-based networks, then the GAN-based networks can train on those watermarked samples that are then embedded with a dataset-specific signal allowing for the deepfake detector 620 to identify a deepfake. In one implementation, the watermark is an alternation of frequency signals in the training dataset content. For example, a watermark (e.g., digital watermark vector) may be embedded in magnitudes of a Fourier transform of the training dataset content. A digital watermark may refer to a kind of marker covertly embedded in a noise-tolerant signal such as audio, video or image data. It is typically used to identify ownership of the signal. "Watermarking" is the process of hiding digital information in a carrier signal.

In implementations of the disclosure, the output quality may be verified to not be degraded by the addition of the input signal 640, as the process of adding the alteration is a simple and scalable task. The process for verifying that the generated image quality is retained, is to train a network using the above watermark technique. Both the original dataset and the altered dataset can be used to train a GAN with the same topology to retain comparable results. After training, both final classifiers are added to respected deepfake models (in this case few shot-face translation). The generated results from both networks can be compared using mean square error (MSE), peak signal-to-noise ratio (PSNR), and structural similarity (SSIM) on red-green-blue (RGB) and Fourier domains. The RGB error difference may be small, whereas the Fourier domain error difference may be large enough to differentiate which dataset was used in the training.

Other input transformations or additive signals can also be utilized in implementations of the disclosure, as long as the coupled training results satisfy the negligible visual error and significant transformation space error, as exemplified above.

FIG. 6B depicts deepfake system 600 including a generative model with architecture modification for deepfake detection, in accordance with implementations of the disclosure. In one implementation, deepfake system 600 is the same as described with respect to FIG. 6A, and elements of FIG. 6B having the same reference numbers (or names) as the elements of any other figure herein can operate or function in any manner similar to that described elsewhere herein, but are not limited to such.

Generators in GANs can leave artifacts (also referred to as "fingerprints") in their results, which may be utilized for source detection. Artifacts may refer to identifiable signals in the results that can be extracted and analyzed. For example, if a GAN utilizes a specific stride, the generated results of the GAN may include an artifact of a checkerboard pattern in the result (where the checkerboard pattern is not perceptually visible, but can be extracted from the results post-processing). Implementations of the disclosure can manipulate these artifacts by modifying the neural network architecture of the GAN 610, in order to better reflect the origins of any deepfake.

Manipulation of artifacts of the GAN may include introducing a neural network (NN) architecture modification 650 to the generator neural network 614 and/or introducing (e.g., embedding) a known (i.e., specific) noise distribution 655 to the generator neural network 614. The NN architecture modification 650 may include, but is not limited to, changing one or more layers in the general neural network 614 and/or modifying one or more operations (i.e., pooling, strides, etc.) that can be used to control residuals of the GAN 610.

The manipulation of artifacts generated by the GAN 610 can make the detection of generated samples simpler for the deepfake detector 620. The deepfake detector 620 may include a residual extractor 628 to extract and analyze artifacts in the samples from sample datastore 622. Residual extractor 628 can be informed of the particular artifact manipulations (i.e., NN architecture modifications 650, known noise distribution 655) made to the GAN 610 prior to analysis by the deepfake detector 620 of samples in sample datastore 622. The example residual extractor 628 of FIG. 6B may be implemented by hardware, software, firmware and/or any combination of hardware, software and/or firmware. Thus, for example, any of the example residual extractor 628 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

Implementations of the disclosure can manipulate the artifacts generated by the GAN 610 in several ways including, but not limited to:

1. Designing upsampling layers in the generator neural network 614 that can leave invisible checkerboard patterns, or other patterns, in the generated content, which are revealed after post-processing by the deepfake detector 620. Upsampling may refer to the process of inserting zero-valued samples between original samples to increase the sampling rate.
2. The combination of strides in different layers of the generator neural network 614 can be coincided to leave a determined pattern for the deepfake detector 620 to recognize in high frequencies.
3. Inserting one or more additional layers in the generator neural network 614 for purposes of inserting a specific artifact in a known spectral interval in order to leave fingerprints to ease detection by deepfake detector 620.
4. Instead of having the generator 612 start from default noise, embedding a known noise distribution 655 and adding a noise reconstruction term in the loss of the generator neural network 614. The deepfake detector 620 can then capture the noise characteristics that are similar to the input noise distribution in order to identify the deepfake.

In some implementations, the above modifications can be encapsulated and distributed in the source implementation and/or the pretrained versions of the generator neural network 614.

FIG. 6C depicts deepfake system 600 including a generative model with intermediary signal insertion for deepfake detection, in accordance with implementations of the disclosure. In one implementation, deepfake system 600 is the same as described with respect to FIGS. 6A and 6B, and elements of FIG. 6C having the same reference numbers (or names) as the elements of any other figure herein can operate or function in any manner similar to that described elsewhere herein, but are not limited to such.

In some implementations, generative models (i.e., GANs) can provide style preservation using an adaptive normalization layer, referred to as adaptive instance normalization (AdaIN) and its derivatives. The adaptive normalization layer approach aims to preserve an "artistic" style (i.e., brush strokes, patterns, color scale, etc.). Implementations of the disclosure can utilize this adaptive normalization layer to insert a determined signal (e.g., instead of the style). The deepfake detector 620 can then recover this determined signal. Similar to preserving style from the style input, implementations of the disclosure can preserve the generator signal.

In one implementation, a determined pattern (i.e., style code 670) is designed, one or more adaptive regularization layers 675 are added to the generator neural network 614, and the determined pattern of style code 670 is inputted to these layers 675. Thereafter, the style preservation loss can then maintain the determined pattern of the style code 670 in the output.

Another adaptation of implementations of the disclosure may include embedding these patterns of style code 670 in the latent representation 665 of the input to the generator 612 (e.g., provided as random vector 660). This implementation may be instead of, or in addition to, embedding the pattern of the style code 670 in the regularization layers 675. For example, in some implementations, the pattern of style code 670 may be inputted to both of the adaptive regularization layers 675 and to the latent representation 665.

The deepfake detector 620 can easily recognize the specific pattern of style code 670 by performing a pattern search on the samples from sample datastore 622. Deepfake detector 620 may utilize a style code extractor 680 to perform and detect the specific pattern of style code 670. In one implementation, style code extractor 680 can be informed of the specific pattern of style code 670 inputted to the GAN 610 prior to analysis by the deepfake detector 620 of samples in sample datastore 622.

The example style code extractor 680 of FIG. 6B may be implemented by hardware, software, firmware and/or any combination of hardware, software and/or firmware. Thus, for example, any of the example style code extractor 680 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

Implementations of the disclosure may utilize one or a combination of one or more of the techniques described above with respect to FIGS. 6A through 6C (i.e., input signal manipulation, architecture modification, intermediary signal insertion). In all three cases, the detection process benefits from the specific signals passed on to the deepfake detector 620. As these signals are known and/or modeled by the generator 612 of the GAN 610, the generated samples are visible as "fake" to the corresponding deepfake detector 620.

Any of the novel approaches discussed above can increase and improve deepfake detection accuracy, can be used for content moderation, can be used for detecting harmful video marking, and/or can be used for limiting illegal uses of deepfakes, etc. The approaches discussed herein also provide the relation between the generator and the source, which can be used in verification of original content, creative content authentication, and/or provenance for legal uses of generative models, for example.

Figure 7:
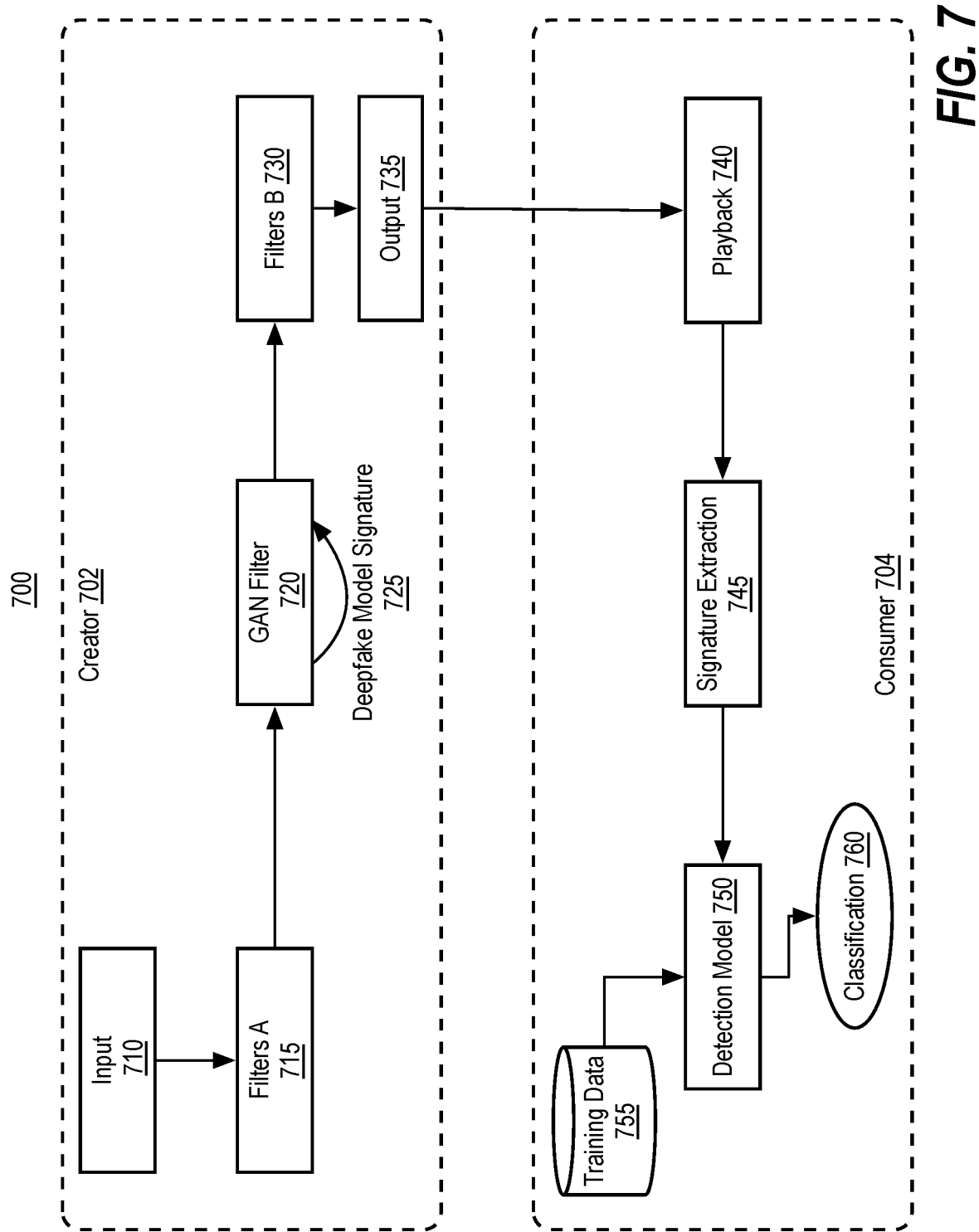
FIG. 7 depicts a schematic of an illustrative flow of deepfake detection in content creation with AI-based enhancements, in accordance with implementations of the disclosure.

FIG. 7 depicts a schematic of an illustrative flow 700 of deepfake detection in content creation with AI-based enhancements, in accordance with implementations of the disclosure. In some implementations, deepfake system 600 described with respect to FIGS. 6A-6C may perform aspects of illustrative flow 700. In one implementation, neural network filters that are already being used in software could employ the approach(es) of implementations of the disclosure for verifiable deepfake detection.

As shown in flow 700, a creator 702 may include software and/or hardware that implements generation of deepfakes via a GAN filter 720. In one example, the creator 702 may be an independent software vendor (ISV) capable of generating synthesized content. The creator 702 may receive input content 710, apply a first set of filters to the input content 710 using Filters A 715, and then apply a transformation to the filtered content using GAN filter 720. The GAN filter 720 may embed a deepfake model signature 725 into generated content from the GAN filter 720. The deepfake model signature 725 may include one or more of the techniques described above with respect to FIGS. 6A-6C (i.e., input signal manipulation, architecture modification, intermediary signal insertion). In some implementations, additional filters may be applied using Filters B 730 to the generated content from GAN filter 720, resulting in an output 735 from the creator 702.

The output 735 may then be consumed by a consumer 704. Consumer 704 may be an end user that can, for example, "playback" 740 (e.g., view, watch, etc.) the content of the final output 735. In one example, the consumer 704 is a computing device executing an application capable of consuming the output 735. In implementations of the disclosure, the consumer 704 may utilize a deepfake detector (such as deepfake detector 620 described with respect to FIGS. 6A-6C) that can analyze the generated content of output 735 and verify that it comes from the GAN embedded in the software of the creator 702. The deepfake detector of consumer 704 can extract a signature 745 from the output 735 and feed this signature into a detection model 750. In one implementation, the detection model 750 can be an ML model trained using training data 755 to classify 760 whether output 735 is a deepfake and/or verify that the output 735 comes from the GAN embedded in the software of the creator 702. The detection model 750 may be trained using the deepfake model signature 725 employed on the generator-side of the GAN, as described above.

FIG. 8 is a flow diagram illustrating an embodiment of a method 800 for generator exploitation for deepfake detection. Method 800 may be performed by processing logic that may comprise hardware (e.g., circuitry, dedicated logic, programmable logic, etc.), software (such as instructions run on a processing device), or a combination thereof. More particularly, the method 800 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 800 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-7 may not be repeated or discussed hereafter. In one implementation, a deepfake system 600 of FIGS. 6A-6C, may perform method 800.

The example process of method 800 of FIG. 8 begins at block 810 where a processing device may alter a generative neural network of a deepfake generator with one or more modifications for deepfake detection. At block 820, the processing device may train the generative neural network having the one or more modifications and a discriminative neural network of the deepfake generator. In one implementation, training the generative neural network and the discriminative neural network is to facilitate the generative neural network to generate deepfake content that includes the one or more modifications.

Subsequently, at block 830, the processing device may communicate identification of the one or more modifications to a deepfake detector to cause the deepfake detector to identify deepfake content generated by the deepfake generator that includes at least one of the one or more modifications. Lastly, at block 840, the processing device may generate deepfake content that includes the one or more modifications. In one implementation, this generated deepfake content is analyzed by the deepfake detector to determine whether the generated deepfake content includes at least one of the one or more modifications.

Figure 9A:
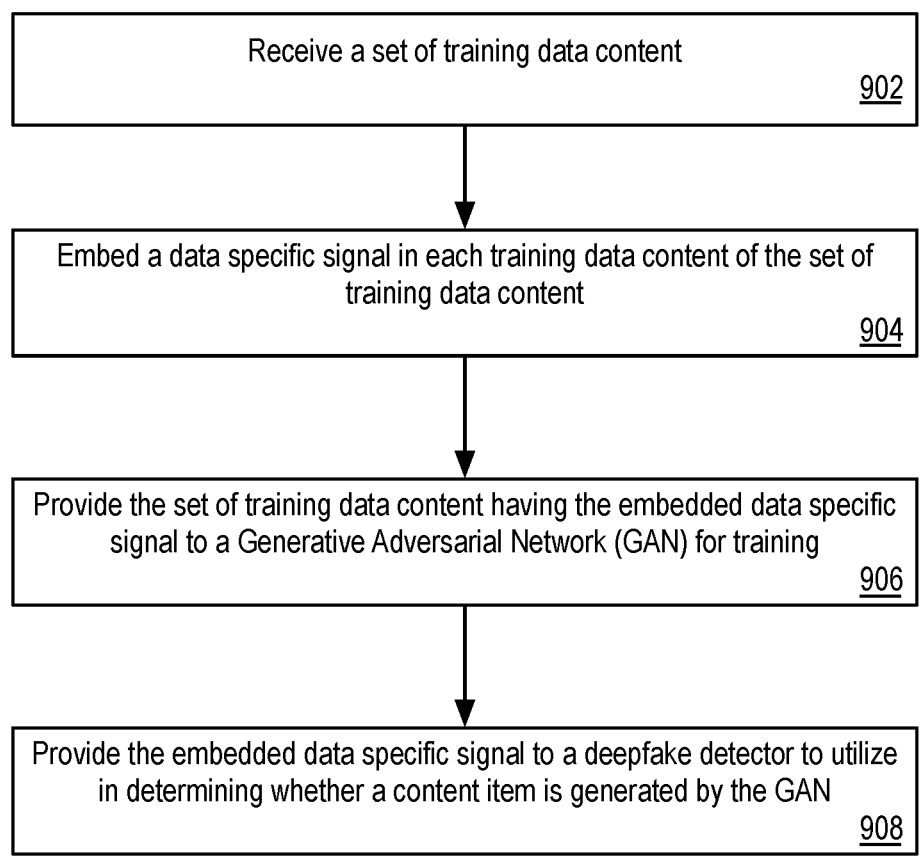

FIG. 9A is a flow diagram illustrating an embodiment of a method 900 for generator exploitation with input manipulation for deepfake detection. Method 900 may be performed by processing logic that may comprise hardware (e.g., circuitry, dedicated logic, programmable logic, etc.), software (such as instructions run on a processing device), or a combination thereof. More particularly, the method 900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 900 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter. In one implementation, a deepfake system 600 of FIG. 6A, may perform method 900.

The example process of method 900 of FIG. 9A begins at block 902 where a processing device may receive a set of training data content. Then, at block 904, the processing device may embed a data specific signal in each training data content of the set of training data content.

Subsequently, at block 906, the processing device may provide the set of training data content having the embedded data specific signal to a GAN for training. Lastly, at block 908, the processing device may provide the embedded data specific signal to a deepfake detector to utilize in determining whether a content item is generated by the GAN.

FIG. 9B is a flow diagram illustrating an embodiment of a method 920 for generator exploitation with architecture modification for deepfake detection. Method 920 may be performed by processing logic that may comprise hardware (e.g., circuitry, dedicated logic, programmable logic, etc.), software (such as instructions run on a processing device), or a combination thereof. More particularly, the method 920 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 920 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter. In one implementation, a deepfake system 600 of FIG. 6B, may perform method 920.

The example process of method 920 of FIG. 9B begins at block 922 where a processing device may modify an architecture of a neural network in a generator portion of a GAN. Then, at block 924, the processing device may generate output content using the generator portion of the GAN. In one implementation, the output content including artifacts resulting from the modifications to the architecture of the neural network in the generator portion of the GAN.

Lastly, at block 926, the processing device may notify a deepfake detector of the artifacts to expect from the modifications to the architecture of the neural network in the generator portion of the GAN. In one implementation, the deepfake detector to utilize the artifacts in determining whether a content item is generated by the GAN.

Figure 9C:
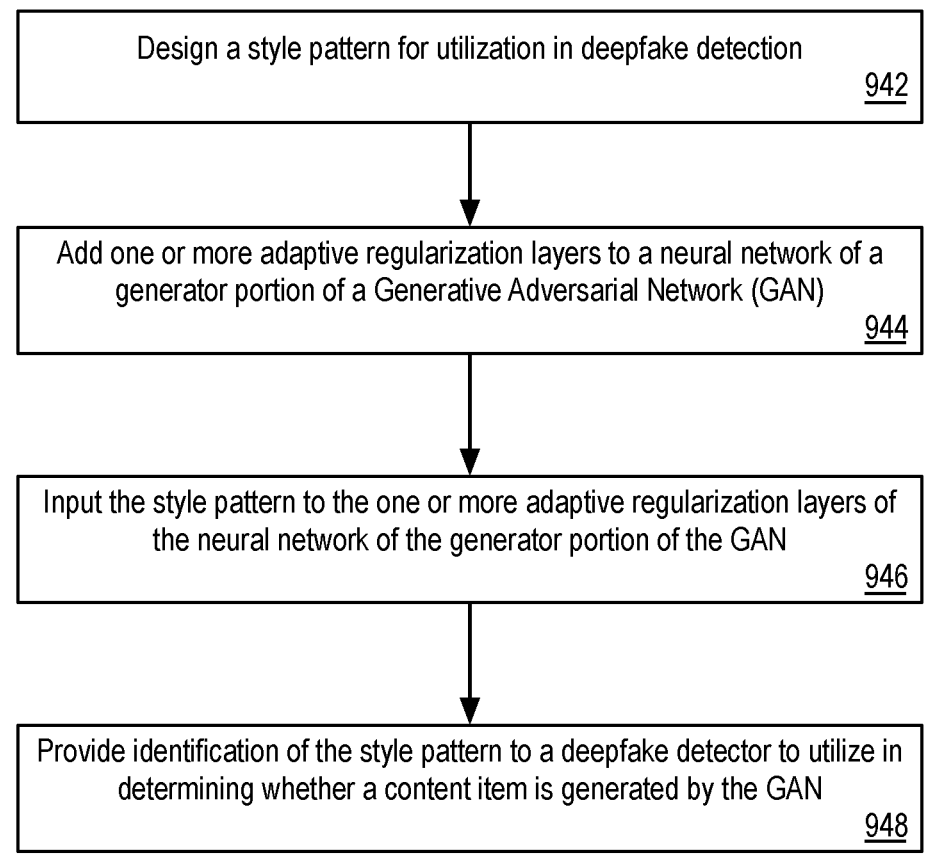

FIG. 9C is a flow diagram illustrating an embodiment of a method 940 for generator exploitation with intermediary signal insertion for deepfake detection. Method 940 may be performed by processing logic that may comprise hardware (e.g., circuitry, dedicated logic, programmable logic, etc.), software (such as instructions run on a processing device), or a combination thereof. More particularly, the method 940 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 940 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter. In one implementation, a deepfake system 600 of FIG. 6C, may perform method 940.

The example process of method 940 of FIG. 9C begins at block 942 where a processing device may design a style pattern for utilization in deepfake detection. Then, at block 944, the processing device may add one or more adaptive regularization layers to a neural network of a generator portion of a GAN.

Subsequently, at block 946, the processing device may input the style pattern to the one or more adaptive regularization layers of the neural network of the generator portion of the GAN. Lastly, at block 948, the processing device may provide identification of the style pattern to a deepfake detector to utilize in determining whether a content item is generated by the GAN.

Figure 10:
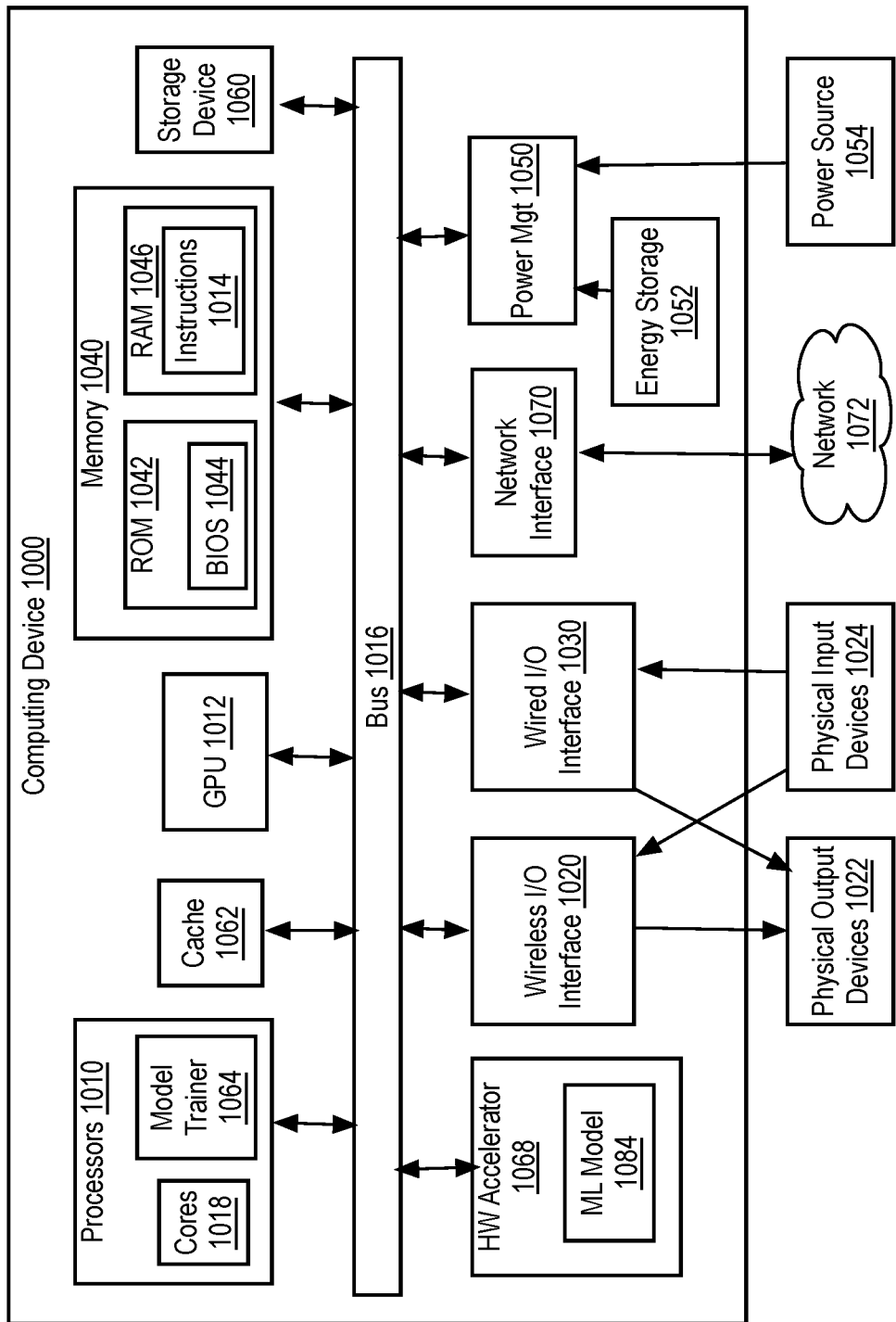
FIG. 10 is a schematic diagram of an illustrative electronic computing device to enable generator exploitation for deepfake detection, according to some implementations.

FIG. 10 is a schematic diagram of an illustrative electronic computing device to enable generator exploitation for deepfake detection, according to some embodiments. In some embodiments, the computing device 1000 includes one or more processors 1010 including one or more processors cores 1018 and a model trainer 1064, the model trainer 1064 to enable generator exploitation for deepfake detection, as provided in FIGS. 1-9. In some embodiments, the computing device 1000 includes a hardware accelerator 1068, the hardware accelerator including a machine learning model 1084. In some embodiments, the computing device is to implement generator exploitation for deepfake detection implementing the machine learning model 1084 for efficient computer vision systems, as provided in FIGS. 1-9.

The computing device 1000 may additionally include one or more of the following: cache 1062, a graphical processing unit (GPU) 1012 (which may be the hardware accelerator in some implementations), a wireless input/output (I/O) interface 1020, a wired I/O interface 1030, memory circuitry 1040, power management circuitry 1050, non-transitory storage device 1060, and a network interface 1070 for connection to a network 1072. The following discussion provides a brief, general description of the components forming the illustrative computing device 1000. Example, non-limiting computing devices 1000 may include a desktop computing device, blade server device, workstation, or similar device or system.

In embodiments, the processor cores 1018 are capable of executing machine-readable instruction sets 1014, reading data and/or instruction sets 1014 from one or more storage devices 1060 and writing data to the one or more storage devices 1060. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 1014 may include instructions to implement generator exploitation for deepfake detection, as provided in FIGS. 1-9.

The processor cores 1018 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1000 includes a bus or similar communications link 1016 that communicably couples and facilitates the exchange of information and/or data between various system components including the processor cores 1018, the cache 1062, the graphics processor circuitry 1012, one or more wireless I/O interfaces 1020, one or more wired I/O interfaces 1030, one or more storage devices 1060, and/or one or more network interfaces 1070. The computing device 1000 may be referred to in the singular herein, but this is not intended to limit the embodiments to a single computing device 1000, since in some embodiments, there may be more than one computing device 1000 that incorporates, includes, or contains any number of communicably coupled, collocated, or remote networked circuits or devices.

The processor cores 1018 may include any number, type, or combination of currently available or future developed devices capable of executing machine-readable instruction sets.

The processor cores 1018 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks do not have to be described in further detail herein, as they can be understood by those skilled in the relevant art. The bus 1016 that interconnects at least some of the components of the computing device 1000 may employ any currently available or future developed serial or parallel bus structures or architectures.

The system memory 1040 may include read-only memory ("ROM") 1042 and random access memory ("RAM") 1046. A portion of the ROM 1042 may be used to store or otherwise retain a basic input/output system ("BIOS") 1044. The BIOS 1044 provides basic functionality to the computing device 1000, for example by causing the processor cores 1018 to load and/or execute one or more machine-readable instruction sets 1014. In embodiments, at least some of the one or more machine-readable instruction sets 1014 cause at least a portion of the processor cores 1018 to provide, create, produce, transition, and/or function as a dedicated, specific, and particular machine, for example a word processing machine, a digital image acquisition machine, a media playing machine, a gaming system, a communications device, a smartphone, or similar.

The computing device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The computing device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include, but are not limited to: universal serial bus (USB), IEEE 1394 ("Fire-Wire"), and similar.

The computing device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the computing device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor cores 1018 and/or graphics processor circuitry 1012 and/or one or more applications executed on or by the processor cores 1018 and/or graphics processor circuitry 1012. In some instances, one or more data storage devices 1060 may be communicably coupled to the processor cores 1018, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.10, or Wi-Fi®, etc.).

Processor-readable instruction sets 1014 and other programs, applications, logic sets, and/or modules may be stored in whole or in part in the system memory 1040. Such instruction sets 1014 may be transferred, in whole or in part, from the one or more data storage devices 1060. The instruction sets 1014 may be loaded, stored, or otherwise retained in system memory 1040, in whole or in part, during execution by the processor cores 1018 and/or graphics processor circuitry 1012.

The computing device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the computing device 1000. The power source 1054 may include, but is not limited to, a solar power system, a commercial electric grid, a portable generator, an external energy storage device, or any combination thereof.

For convenience, the processor cores 1018, the graphics processor circuitry 1012, the wireless I/O interface 1020, the wired I/O interface 1030, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 1018 and/or the graphics processor circuitry 1012. In some embodiments, all or a portion of the bus 1016 may be omitted and the components are coupled directly to each other using suitable wired or wireless connections.

Flowcharts representative of example hardware logic, machine readable instructions, hardware implemented state machines, and/or any combination thereof for implementing the system 100 of FIG. 1, for example, are shown in FIGS. 8 and/or 9A-9C. The machine readable instructions may be one or more executable programs or portion(s) of an executable program for execution by a computer processor such as the processor 1010 shown in the example computing device 1000 discussed above in connection with FIG. 10. The program may be embodied in software stored on a non-transitory computer readable storage medium such as a CD-ROM, a floppy disk, a hard drive, a DVD, a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowcharts illustrated in FIGS. 8 and/or 9A-9C, many other methods of implementing the example systems may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9 and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it can be understood that such descriptors are used merely for ease of referencing multiple elements or components.

The following examples pertain to further embodiments. Example 1 is an apparatus to facilitate generator exploitation for deepfake detection. The apparatus of Example 1 comprises one or more processors to: alter a generative neural network of a deepfake generator with one or more modifications for deepfake detection; train the generative neural network having the one or more modifications and a discriminative neural network of the deepfake generator, wherein training the generative neural network and the discriminative neural network to facilitate the generative neural network to generate deepfake content comprising the one or more modifications; and communicate identification of the one or more modifications to a deepfake detector to cause the deepfake detector to identify deepfake content generated by the deepfake generator that comprises at least one of the one or more modifications.

In Example 2, the subject matter of Example 1 can optionally include wherein the deepfake generator is a generative adversarial network (GAN), and wherein the GAN comprises the generative neural network and the discriminative neural network. In Example 3, the subject matter of any one of Examples 1-2 can optionally include wherein the one or more modifications comprise an input manipulation of dataset content used for training by the generative neural network.

In Example 4, the subject matter of any one of Examples 1-3 can optionally include wherein the input manipulation comprises altering frequency signals in the dataset content. In Example 5, the subject matter of any one of Examples 1-4 can optionally include wherein the one or more modifications comprise an architecture modification of the generative neural network.

In Example 6, the subject matter of any one of Examples 1-5 can optionally include wherein the architecture modification comprises at least one of: modifying a design of upsampling layers of the generative neural network, inputting a combination of strides in different layers of the generative neural network, inserting an additional layer in the generative neural network, or embedding a specific noise distribution to the generative neural network. In Example 7, the subject matter of any one of Examples 1-6 can optionally include wherein the one or more modifications comprise an intermediary signal insertion to the generative neural network.

In Example 8, the subject matter of any one of Examples 1-7 can optionally include wherein the intermediary signal insertion comprises generating a determined pattern, adding one or more adaptive regularization layers to the generative neural network, and inputting the determined pattern to the one or more adaptive regularization layers. In Example 9, the subject matter of any one of Examples 1-8 can optionally include wherein the intermediary signal insertion comprises generating a determined pattern, and inputting the determined pattern to a latent representation of an input to the generative neural network.

Example 10 is a non-transitory computer-readable storage medium for facilitating generator exploitation for deepfake detection. The non-transitory computer-readable storage medium of Example 10 having stored thereon executable computer program instructions that, when executed by one or more processors, cause the one or more processors to perform operations comprising: altering a generative neural network of a deepfake generator with one or more modifications for deepfake detection; training the generative neural network having the one or more modifications and a discriminative neural network of the deepfake generator, wherein training the generative neural network and the discriminative neural network to facilitate the generative neural network to generate deepfake content comprising the one or more modifications; and communicating identification of the one or more modifications to a deepfake detector to cause the deepfake detector to identify deepfake content generated by the deepfake generator that comprises at least one of the one or more modifications.

In Example 11, the subject matter of Example 10 can optionally include wherein the deepfake generator is a generative adversarial network (GAN), and wherein the GAN comprises the generative neural network and the discriminative neural network. In Example 12, the subject matter of Examples 10-11 can optionally include wherein the one or more modifications comprise an input manipulation of dataset content used for training by the generative neural network.

In Example 13, the subject matter of Examples 10-12 can optionally include wherein the architecture modification comprises at least one of: modifying a design of upsampling layers of the generative neural network, inputting a combination of strides in different layers of the generative neural network, inserting an additional layer in the generative neural network, or embedding a specific noise distribution to the generative neural network.

In Example 14, the subject matter of Examples 10-13 can optionally include wherein the one or more modifications comprise an intermediary signal insertion to the generative neural network. In Example 15, the subject matter of Examples 10-14 can optionally include wherein the intermediary signal insertion comprises generating a determined pattern, adding one or more adaptive regularization layers to the generative neural network, and inputting the determined pattern to the one or more adaptive regularization layers.

Example 16 is a method for facilitating generator exploitation for deepfake detection. The method of Example 16 can include altering, by a processing device, a generative neural network of a deepfake generator with one or more modifications for deepfake detection; training the generative neural network having the one or more modifications and a discriminative neural network of the deepfake generator, wherein training the generative neural network and the discriminative neural network to facilitate the generative neural network to generate deepfake content comprising the one or more modifications; and communicating identification of the one or more modifications to a deepfake detector to cause the deepfake detector to identify deepfake content generated by the deepfake generator that comprises at least one of the one or more modifications.

In Example 17, the subject matter of Example 16 can optionally include wherein the one or more modifications comprise an input manipulation of dataset content used for training by the generative neural network. In Example 18, the subject matter of any one of Examples 16-17 can optionally include wherein the architecture modification comprises at least one of: modifying a design of upsampling layers of the generative neural network, inputting a combination of strides in different layers of the generative neural network, inserting an additional layer in the generative neural network, or embedding a specific noise distribution to the generative neural network.

In Example 19, the subject matter of any one of Examples 16-18 can optionally include wherein the one or more modifications comprise an intermediary signal insertion to the generative neural network. In Example 20, the subject matter of any one of Examples 16-19 can optionally include wherein the intermediary signal insertion comprises generating a determined pattern, adding one or more adaptive regularization layers to the generative neural network, and inputting the determined pattern to the one or more adaptive regularization layers.

Example 21 is a system for facilitating generator exploitation for deepfake detection. The system of Example 21 can optionally include a memory, and a processor communicably coupled to the memory. The processor of the system of Example 21 can alter a generative neural network of a deepfake generator with one or more modifications for deepfake detection; train the generative neural network having the one or more modifications and a discriminative neural network of the deepfake generator, wherein training the generative neural network and the discriminative neural network to facilitate the generative neural network to generate deepfake content comprising the one or more modifications; and communicate identification of the one or more modifications to a deepfake detector to cause the deepfake detector to identify deepfake content generated by the deepfake generator that comprises at least one of the one or more modifications.

In Example 22, the subject matter of Example 21 can optionally include wherein the deepfake generator is a generative adversarial network (GAN), and wherein the GAN comprises the generative neural network and the discriminative neural network. In Example 23, the subject matter of any one of Examples 21-22 can optionally include wherein the one or more modifications comprise an input manipulation of dataset content used for training by the generative neural network.

In Example 24, the subject matter of any one of Examples 21-23 can optionally include wherein the input manipulation comprises altering frequency signals in the dataset content. In Example 25, the subject matter of any one of Examples 21-24 can optionally include wherein the one or more modifications comprise an architecture modification of the generative neural network.

In Example 26, the subject matter of any one of Examples 21-25 can optionally include wherein the architecture modification comprises at least one of: modifying a design of upsampling layers of the generative neural network, inputting a combination of strides in different layers of the generative neural network, inserting an additional layer in the generative neural network, or embedding a specific noise distribution to the generative neural network. In Example 27, the subject matter of any one of Examples 21-26 can optionally include wherein the one or more modifications comprise an intermediary signal insertion to the generative neural network.

In Example 28, the subject matter of any one of Examples 21-27 can optionally include wherein the intermediary signal insertion comprises generating a determined pattern, adding one or more adaptive regularization layers to the generative neural network, and inputting the determined pattern to the one or more adaptive regularization layers. In Example 29, the subject matter of any one of Examples 21-28 can optionally include wherein the intermediary signal insertion comprises generating a determined pattern, and inputting the determined pattern to a latent representation of an input to the generative neural network.

Example 30 is an apparatus for facilitating generator exploitation for deepfake detection according to implementations of the disclosure. The apparatus of Example 30 can comprise means for altering a generative neural network of a deepfake generator with one or more modifications for deepfake detection; means for training the generative neural network having the one or more modifications and a discriminative neural network of the deepfake generator, wherein training the generative neural network and the discriminative neural network to facilitate the generative neural network to generate deepfake content comprising the one or more modifications; and means for communicating identification of the one or more modifications to a deepfake detector to cause the deepfake detector to identify deepfake content generated by the deepfake generator that comprises at least one of the one or more modifications.

In Example 31, the subject matter of Example 30 can optionally include the apparatus further configured to perform the method of any one of the Examples 17 to 20.

Example 32 is at least one machine readable medium comprising a plurality of instructions that in response to being executed on a computing device, cause the computing device to carry out a method according to any one of Examples 16-20. Example 33 is an apparatus for facilitating generator exploitation for deepfake detection, configured to perform the method of any one of Examples 16-20. Example 34 is an apparatus for facilitating generator exploitation for deepfake detection comprising means for performing the method of any one of claims 16 to 20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
one or more processors to:
alter a generative neural network of a deepfake generator with a deepfake model signature comprising one or more modifications, wherein the deepfake model signature utilized for identification of deepfake content that is generated by the deepfake generator, and wherein the deepfake model signature identifies content generated by the deepfake generator as authorized deepfake content;

train the generative neural network having the one or more modifications and train a discriminative neural network of the deepfake generator, wherein training the generative neural network and the discriminative neural network is to facilitate the generative neural network to generate deepfake content comprising the one or more modifications of the deepfake model signature, and wherein the generative neural network is trained in tandem with the discriminative neural network to increase an error rate of the discriminative neural network with respect to the deepfake content; and communicate identification of the deepfake model signature to a deepfake detector for training of the deepfake detector, wherein the training of the deepfake detector is to enable the deepfake detector to analyze the deepfake content generated by the deepfake generator for determination of whether the deepfake content is generated by the generative neural network by identifying the one or more modifications of the deepfake model signature in the deepfake content.

2. The apparatus of claim 1, wherein the deepfake generator is a generative adversarial network (GAN), and wherein the GAN comprises the generative neural network and the discriminative neural network.

3. The apparatus of claim 1, wherein the one or more modifications comprise an input manipulation of dataset content used for training by the generative neural network.

4. The apparatus of claim 3, wherein the input manipulation comprises altering frequency signals in the dataset content.

5. The apparatus of claim 1, wherein the one or more modifications comprise an architecture modification of the generative neural network.

6. The apparatus of claim 5, wherein the architecture modification comprises at least one of modifying a design of upsampling layers of the generative neural network, inputting a combination of strides in different layers of the generative neural network, inserting an additional layer in the generative neural network, or embedding a specific noise distribution to the generative neural network.

7. The apparatus of claim 1, wherein the one or more modifications comprise an intermediary signal insertion to the generative neural network.

8. The apparatus of claim 7, wherein the intermediary signal insertion comprises generating a determined pattern, adding one or more adaptive regularization layers to the generative neural network, and inputting the determined pattern to the one or more adaptive regularization layers.

9. The apparatus of claim 7, wherein the intermediary signal insertion comprises generating a determined pattern and inputting the determined pattern to a latent representation of an input to the generative neural network.

10. A non-transitory computer-readable storage medium having stored thereon executable computer program instructions that, when executed by one or more processors, cause the one or more processors to perform operations comprising:

altering a generative neural network of a deepfake generator with a deepfake model signature comprising one or more modifications, wherein the deepfake model signature utilized for identification of deepfake content that is generated by the deepfake generator, and wherein the deepfake model signature identifies content generated by the deepfake generator as authorized deepfake content;

training the generative neural network having the one or more modifications and training a discriminative neural network of the deepfake generator, wherein training the generative neural network and the discriminative neural network is to facilitate the generative neural network to generate deepfake content comprising the one or more modifications of the deepfake model signature, and wherein the generative neural network is trained in tandem with the discriminative neural network to increase an error rate of the discriminative neural network with respect to the deepfake content; and communicating identification of the deepfake model signature to a deepfake detector for training of the deepfake detector, wherein the training of the deepfake detector is to enable the deepfake detector to analyze the deepfake content generated by the deepfake generator for determination of whether the deepfake content is generated by the generative neural network by identifying the one or more modifications of the deepfake model signature in the deepfake content.

11. The non-transitory computer-readable storage medium of claim 10, wherein the deepfake generator is a generative adversarial network (GAN), and wherein the GAN comprises the generative neural network and the discriminative neural network.

12. The non-transitory computer-readable storage medium of claim 10, wherein the one or more modifications comprise an input manipulation of dataset content used for training by the generative neural network.

13. The non-transitory computer-readable storage medium of claim 10, wherein the one or more modifications comprise an architecture modification of the generative neural network, and wherein the architecture modification comprises at least one of modifying a design of upsampling layers of the generative neural network, inputting a combination of strides in different layers of the generative neural network, inserting an additional layer in the generative neural network, or embedding a specific noise distribution to the generative neural network.

14. The non-transitory computer-readable storage medium of claim 10, wherein the one or more modifications comprise an intermediary signal insertion to the generative neural network.

15. The non-transitory computer-readable storage medium of claim 14, wherein the intermediary signal insertion comprises generating a determined pattern, adding one or more adaptive regularization layers to the generative neural network, and inputting the determined pattern to the one or more adaptive regularization layers.

16. A method comprising:

altering, by a processing device, a generative neural network of a deepfake generator with a deepfake model signature comprising one or more modifications, wherein the deepfake model signature utilized for identification of deepfake content that is generated by the deepfake generator, and wherein the deepfake model signature identifies content generated by the deepfake generator as authorized deepfake content;

training the generative neural network having the one or more modifications and training a discriminative neural network of the deepfake generator, wherein training the generative neural network and the discriminative neural network is to facilitate the generative neural network to generate deepfake content comprising the one or more modifications of the deepfake model signature, and wherein the generative neural network is trained in tandem with the discriminative neural network to increase an error rate of the discriminative neural network with respect to the deepfake content; and communicating identification of the deepfake model signature to a deepfake detector for training of the deepfake detector, wherein the training of the deepfake detector is to enable the deepfake detector to analyze the deepfake content generated by the deepfake generator for determination of whether the deepfake content is generated by the generative neural network by identifying the one or more modifications of the deepfake model signature in the deepfake content.

17. The method of claim 16, wherein the one or more modifications comprise an input manipulation of dataset content used for training by the generative neural network.

18. The method of claim 16, wherein the one or more modifications comprise an architecture modification of the generative neural network, and wherein the architecture modification comprises at least one of modifying a design of upsampling layers of the generative neural network, inputting a combination of strides in different layers of the generative neural network, inserting an additional layer in the generative neural network, or embedding a specific noise distribution to the generative neural network.

19. The method of claim 16, wherein the one or more modifications comprise an intermediary signal insertion to the generative neural network.

20. The method of claim 19, wherein the intermediary signal insertion comprises generating a determined pattern, adding one or more adaptive regularization layers to the generative neural network, and inputting the determined pattern to the one or more adaptive regularization layers.

* * * * *